(12) United States Patent
Obata et al.

(10) Patent No.: US 11,333,789 B2
(45) Date of Patent: May 17, 2022

(54) SYSTEM AND INSPECTION METHOD

(71) Applicant: KABUSHIKI KAISHA TOSHIBA, Tokyo (JP)

(72) Inventors: Haruka Obata, Ota Tokyo (JP); Xu Zhu, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/807,354

(22) Filed: Mar. 3, 2020

(65) Prior Publication Data
US 2020/0393594 A1 Dec. 17, 2020

(30) Foreign Application Priority Data
Jun. 17, 2019 (JP) .............................. JP2019-112009

(51) Int. Cl.
*G01V 8/00* (2006.01)
*G06T 7/70* (2017.01)
*G06K 9/00* (2022.01)
*G06V 40/10* (2022.01)

(52) U.S. Cl.
CPC ............... *G01V 8/005* (2013.01); *G06T 7/70* (2017.01); *G06V 40/10* (2022.01); *G06T 2207/30196* (2013.01); *G06V 2201/05* (2022.01); *G06V 2201/07* (2022.01)

(58) Field of Classification Search
CPC .............. G01V 8/005; G06K 9/00362; G06K 2209/21; G06K 2209/09; G06T 7/70; G06T 2207/30196; G06V 40/10
See application file for complete search history.

(56) References Cited

U.S. PATENT DOCUMENTS

| 6,777,684 B1 * | 8/2004 | Volkov ............... G01N 21/3581 250/341.1 |
| 9,282,258 B2 * | 3/2016 | Kuznetsov ......... G06K 9/00771 |
| 2008/0298684 A1 * | 12/2008 | Lundgren ................. G01J 3/32 382/191 |
| 2009/0318815 A1 * | 12/2009 | Barnes ................. A61B 5/0064 600/473 |

(Continued)

FOREIGN PATENT DOCUMENTS

JP 2020085461 A 6/2020

OTHER PUBLICATIONS

U.S. Appl. No. 16/555,381, filed Aug. 29, 2019, First Named Inventor: Xu Zhu, Title: Electronic Apparatus and Imaging Method.

*Primary Examiner* — Dramos Kalapodas
(74) *Attorney, Agent, or Firm* — Holtz, Holtz & Volek PC

(57) ABSTRACT

According to one embodiment, an antenna is configured to irradiate a first electromagnetic wave of a wavelength of 1 mm to 30 mm to a first position in an area in which at least one of a target person or a belonging of the target person is present, and irradiate a second electromagnetic wave of a wavelength of 1 mm to 30 mm to a second position in the area. Processor circuitry is configured to obtain a first reflection intensity of the first electromagnetic wave on the first position, and obtain a second reflection intensity of the second electromagnetic wave on the second position, and determine a degree of danger relating to a possibility that the target person possesses a dangerous article.

24 Claims, 17 Drawing Sheets

(56) References Cited

U.S. PATENT DOCUMENTS

| | | | |
|---|---|---|---|
| 2009/0326383 A1* | 12/2009 | Barnes | H04N 5/2256 |
| | | | 600/476 |
| 2014/0028457 A1* | 1/2014 | Reinpoldt | G06K 9/00771 |
| | | | 340/552 |
| 2015/0310713 A1* | 10/2015 | Kellerman | G08B 15/007 |
| | | | 340/541 |
| 2016/0242131 A1* | 8/2016 | Popovic | H04B 1/7073 |
| 2018/0067204 A1* | 3/2018 | Frizzell | G01S 13/887 |
| 2018/0204111 A1* | 7/2018 | Zadeh | G06N 3/0436 |
| 2020/0161775 A1 | 5/2020 | Zhu et al. | |
| 2020/0249324 A1* | 8/2020 | Steinberg | G01S 7/4814 |

* cited by examiner

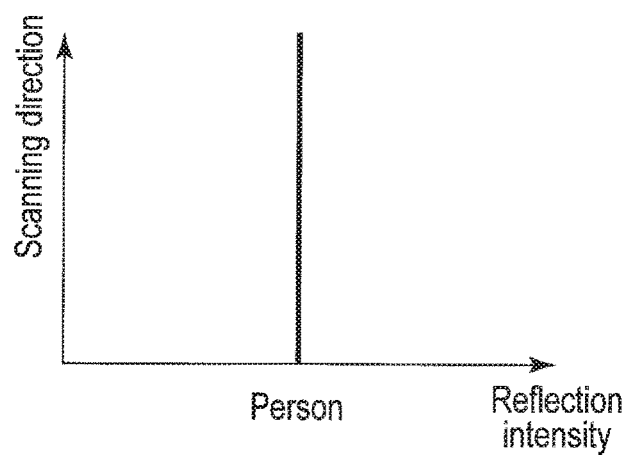
F I G. 7A
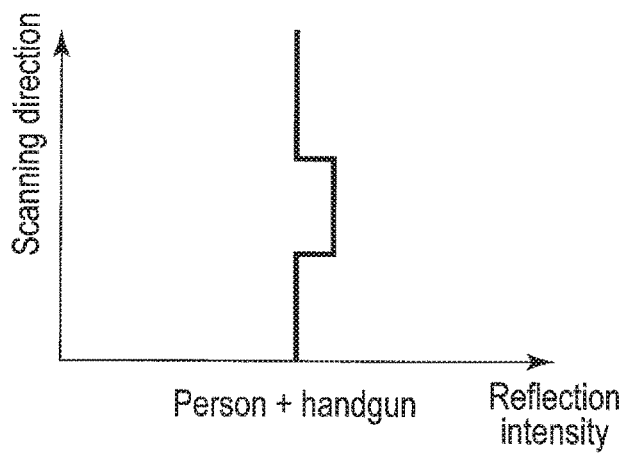
F I G. 7B
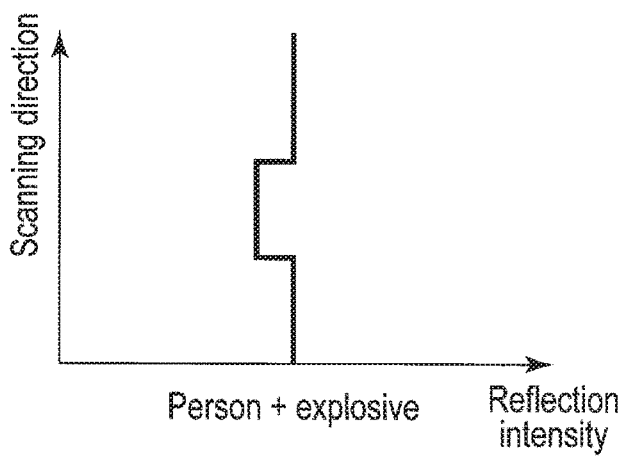
F I G. 7C

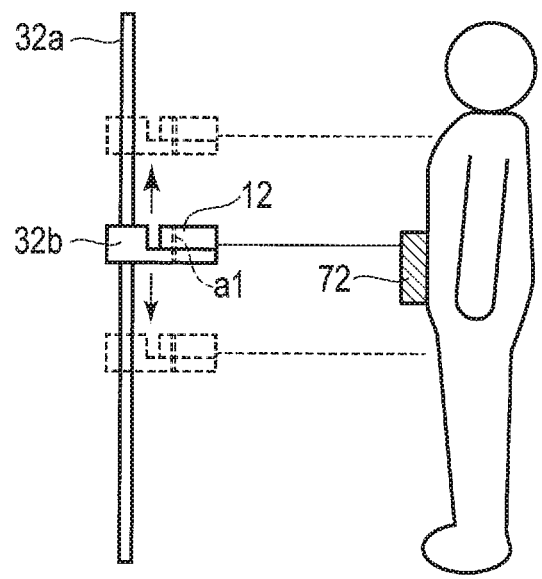
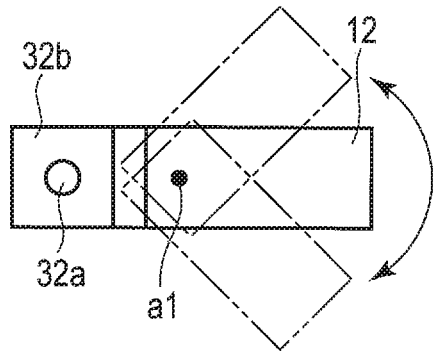
FIG. 10A                FIG. 10B
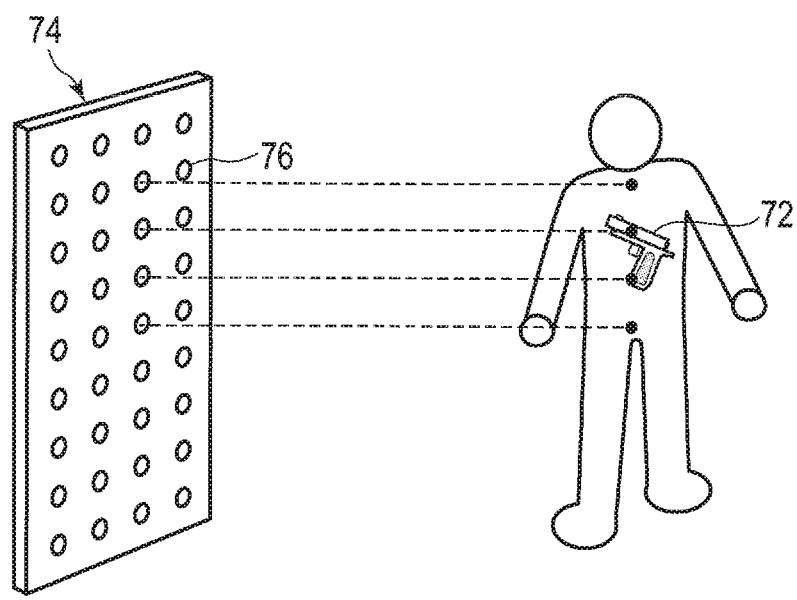
FIG. 11

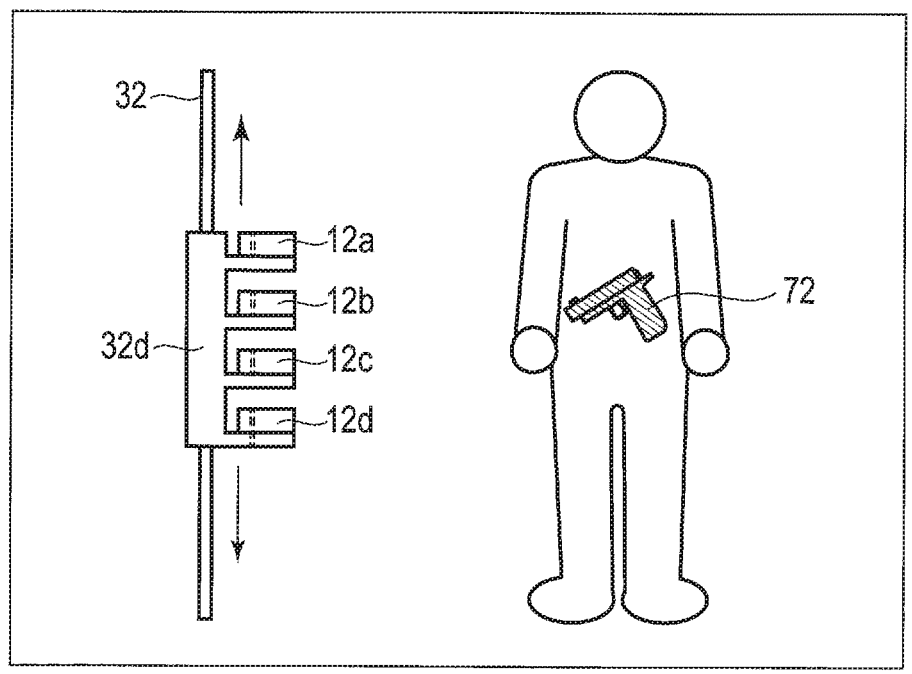
F I G. 14A
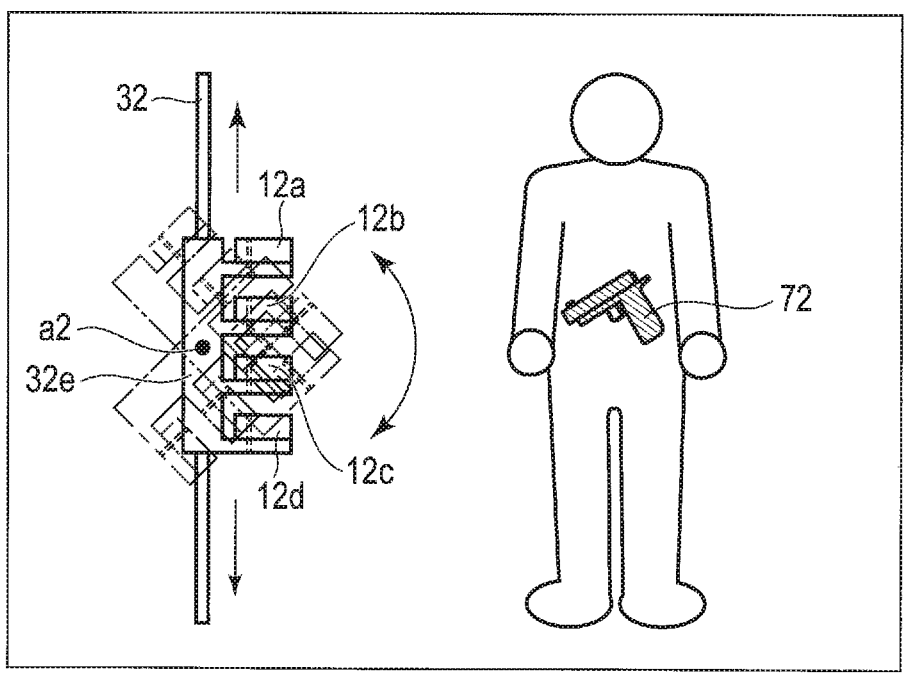
F I G. 14B

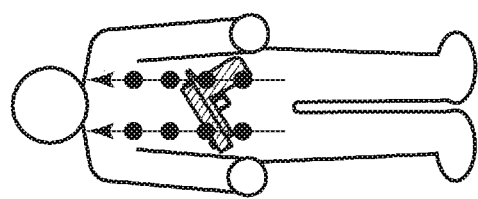
FIG. 16A
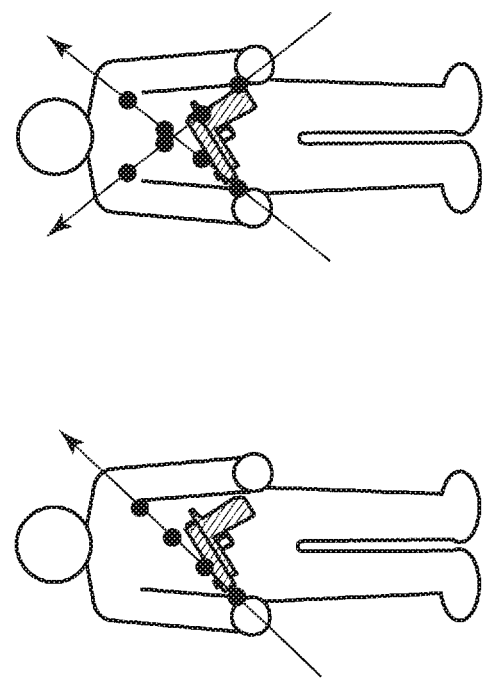
FIG. 16B
FIG. 16C
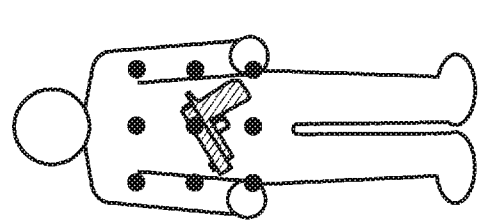
FIG. 16D
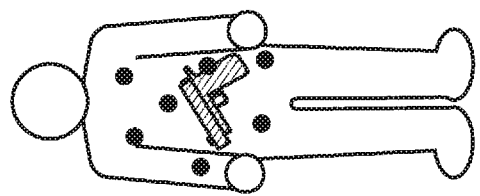
FIG. 16E
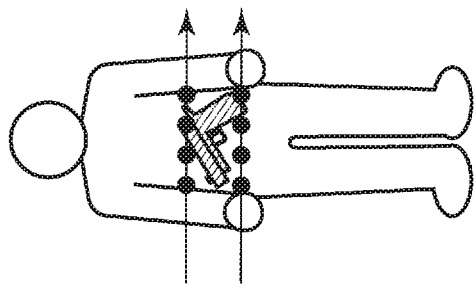
FIG. 16F
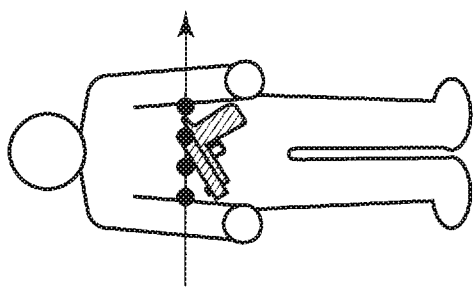
FIG. 16G

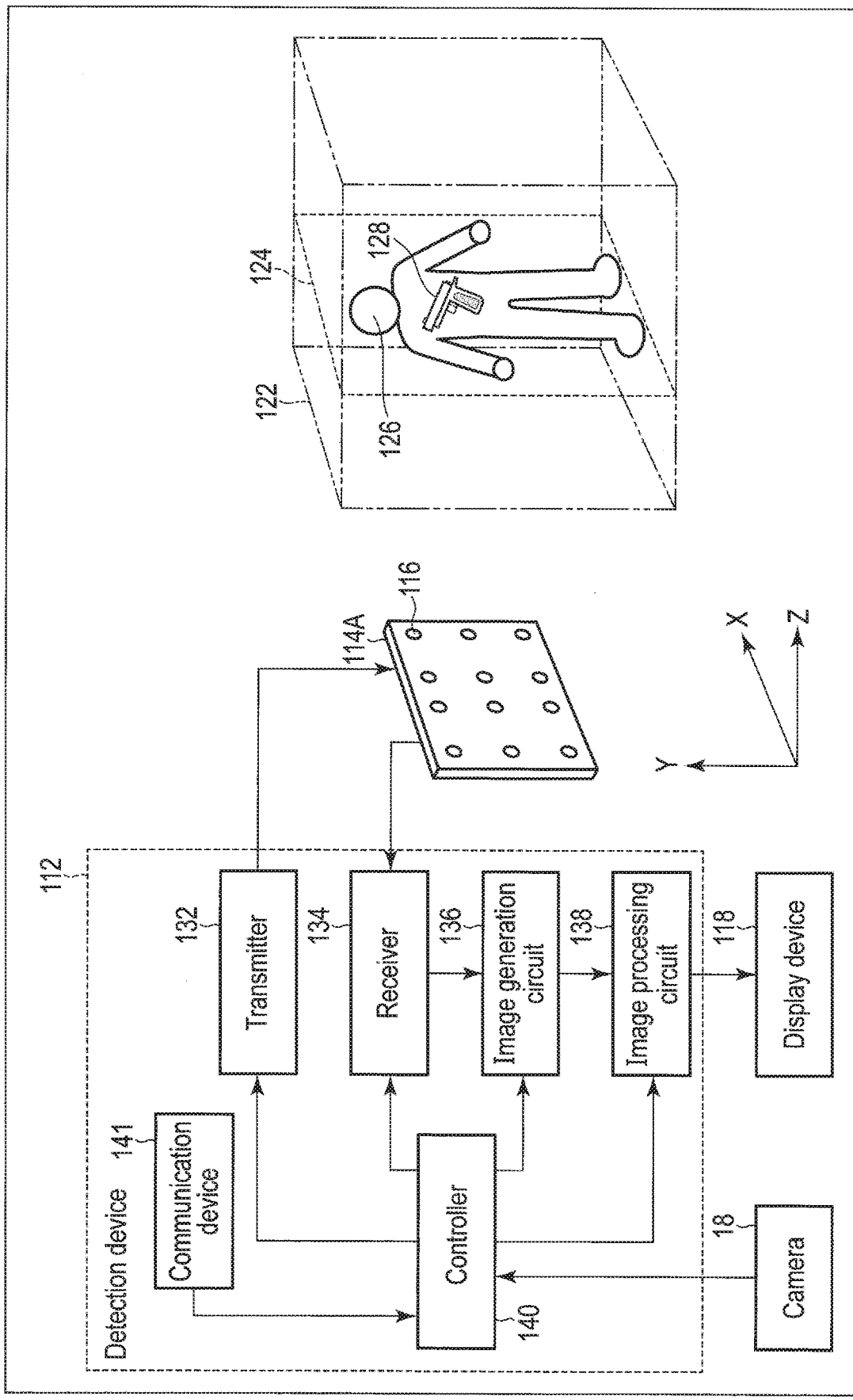
F I G. 17

SYSTEM AND INSPECTION METHOD

CROSS-REFERENCE TO RELATED APPLICATIONS

This application is based upon and claims the benefit of priority from Japanese Patent Application No. 2019-112009, filed Jun. 17, 2019, the entire contents of which are incorporated herein by reference.

FIELD

Embodiments described herein relate generally to a system and an inspection method.

BACKGROUND

Many inspection systems of determining whether a target person of an inspection has a dangerous article with being hidden have been proposed. As an example, an inspection apparatus irradiates an electromagnetic wave to the target person, receives a reflection wave from the target person, and performs high-definition imaging of a dangerous article based on the amplitude of the received signal. In such an apparatus that performs high-definition imaging, it is necessary to irradiate an electromagnetic wave to a very large number of points of the target person, and thus it takes a lot of time for inspection.

As a method of determining possession of a dangerous article in a short time, a following method is proposed. In this method, an electromagnetic wave is irradiated to at least two points of the target person. Reflection waves from clothes and reflection waves from the body are detected for each irradiation, and an optical distance between the clothes and the body is calculated based on a difference between detection signals. If there is a difference between optical distances of at least two points, and the difference is equal to or greater than a threshold value, it is determined that the target person has a dielectric explosive hidden between the clothing and the body.

However, since the distance between the clothes and the body is very small, a high resolution is required for calculating the optical distance. In general, the electromagnetic wave reflectance of clothes is low. In particular, wool clothing such as a sweater hardly reflects an electromagnetic wave. For this reason, in an actual environment with many interferences and much noise, the reflection wave from the clothes is buried in the noise and the interferences, and thus it is difficult to detect such a reflection wave. Therefore, it is difficult to calculate the optical distance with high accuracy.

Further, since this method is based on the premise that the optical path is extended by the presence of the dielectric, the dangerous article allowed to be detected is limited to explosives, and it is not possible to detect a metallic dangerous article such as a handgun.

BRIEF DESCRIPTION OF THE DRAWINGS

FIGS. 7A, 7B, and 7C are diagrams illustrating an example of dangerous article screening according to the embodiment.

FIGS. 10A and 10B are diagrams illustrating a second example of the scanning by the radar.

FIG. 11 is a diagram illustrating a third example of the scanning by the radar.

FIGS. 14A and 14B are diagrams illustrating a sixth example of the scanning by the radar.

FIGS. 16A, 16B, 16C, 16D, 16E, 16F, and 16G are diagrams illustrating other examples of the scanning by the radar.

FIG. 17 is a block diagram illustrating an example of an electrical configuration of the system according to the embodiment, which functions as a secondary screening system.

DETAILED DESCRIPTION

Figure 1A:
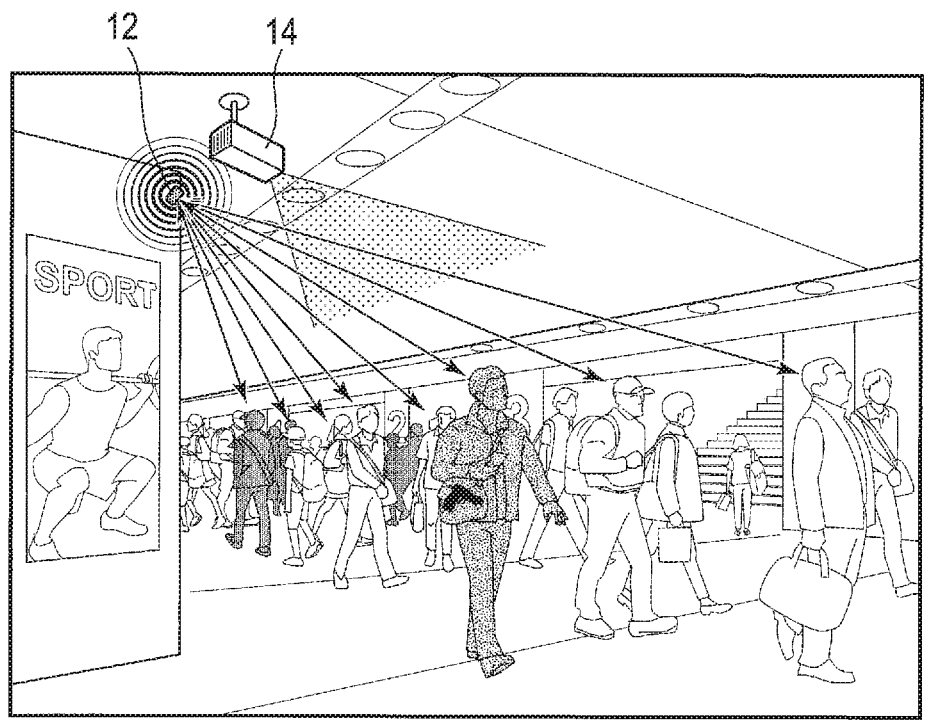
FIGS. 1A and 1B are diagrams illustrating an outline of an example of a dangerous-article screening system including a system according to an embodiment.

Hereinafter, an embodiment will be described with reference to the drawings. The following descriptions are provided to exemplify an apparatus and a method for embodying the technical idea of the embodiment. The technical idea of the embodiment is not limited to a structure, shapes, arrangement, materials, and the like of components described below. Modifications easily conceivable by those skilled in the art are naturally included in the scope of the disclosure. In order to make the descriptions clearer, in the drawings, each element may be schematically expressed by changing the size, the thickness, the planar dimension, the shape, or the like of the element from that in an actual embodiment. In a plurality of drawings, elements having different dimensional relations and different ratios may be included. In the plurality of drawings, corresponding elements may be denoted by the same reference signs, and repetitive descriptions may be omitted. Although a plurality of names may be given to some elements, the names are merely examples, and other names are given to the elements. Other names are given to elements to which a plurality of names are not given. In the following descriptions, "a connection" means not only a direct connection, but also an indirect connection through another element.

In general, according to one embodiment, a system comprises a first antenna and first processor circuitry. The first antenna is configured to irradiate a first electromagnetic wave of a wavelength of 1 mm to 30 mm to a first position in an area in which at least one of a target person or a belonging of the target person is present, and irradiate a second electromagnetic wave of a wavelength of 1 mm to 30 mm to a second position in the area different from the first position in the area. The first processor circuitry configured to obtain a first reflection intensity of the first electromagnetic wave on the first position, and obtain a second reflection intensity of the second electromagnetic wave on the second position, and determine a degree of danger relating to a possibility that the target person possesses a dangerous article, based on a difference between the first reflection intensity and the second reflection intensity.

Embodiment

[Screening System]

A system according to the embodiment will be described. The system according to the embodiment can be applied to various inspection apparatuses. However, the embodiment relates to a dangerous-article screening system. The system detects a person who possesses a dangerous article such as a handgun or an explosive, in a facility in which an unspecified number of people gather, such as an airport, a station, a shopping mall, a concert hall, and an exhibition hall. Since the person moves, the person may not stay in an inspection area for a long time. Thus, it is desired to detect a dangerous article accurately in a short time. Therefore, a screening system according to the embodiment detects the dangerous article by narrowing down in two stages of primary screening and secondary screening.

Figure 1B:
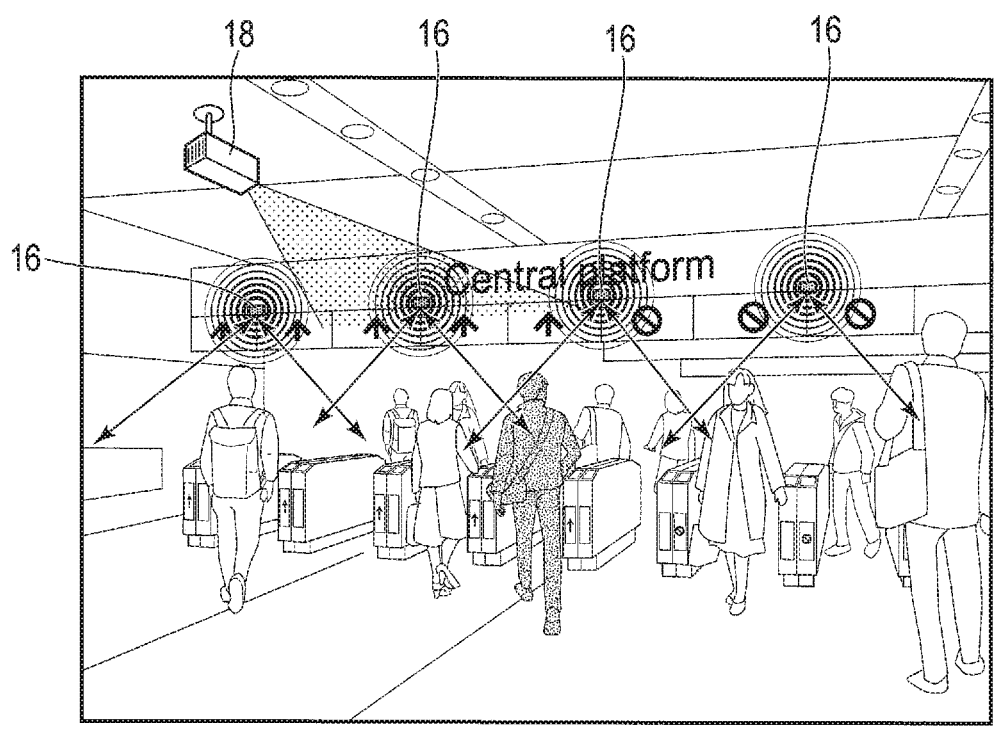

An outline of the two-stage screening system will be described with reference to FIGS. 1A and 1B. FIG. 1A illustrates an outline of a primary screening system. FIG. 1B illustrates an outline of a secondary screening system. The screening includes a type using an electromagnetic wave and a type using an X-ray. Here, an example using an electromagnetic wave will be described. An electromagnetic wave used in the embodiment includes a wave having a wavelength in a range of 1 mm to 30 mm. The electromagnetic wave having a wavelength of 1 mm to 10 mm is referred to as a millimeter wave. The electromagnetic wave having a wavelength of 10 mm to 100 mm is referred to as a microwave. When an electromagnetic wave is irradiated to a target person to be inspected, the electromagnetic wave is reflected by an object on a path on which the electromagnetic wave propagates. By measuring the reflection intensity of electromagnetic wave reflected at a certain distance, it is possible to determine whether an object present at the distance is a body or a dangerous article such as a handgun or an explosive.

As shown in FIG. 1A, in the primary screening, a wide area in which many people gather, such as concourses and entrances of airports, stations, shopping malls, concert halls, and exhibition halls is used as an inspection area. A radar 12 and a camera 14 are installed on the ceiling, the wall, or the floor of the inspection area. The camera 14 captures an image of a person arranged in the inspection area. A person is recognized from the image of the inspection area captured by the camera 14. The radar 12 irradiates an electromagnetic wave to the recognized person. The radar 12 repeats to irradiate an electromagnetic wave while changing an irradiation direction. The radar 12 performs scanning of a target person with an electromagnetic wave by irradiating the electromagnetic wave to a plurality of (at least two) points of the target person. An electromagnetic wave irradiation point on the target person may be changed electronically or mechanically. In the latter case, the radar 12 is installed on the ceiling, the wall, or the floor via a scanning mechanism. The scanning mechanism may change the position of the radar 12 in a straight line (also referred to as linear scanning) or change the direction of the radar 12 (also referred to as sector scanning). When a plurality of persons are recognized, the radar 12 sequentially irradiates an electromagnetic wave to a plurality of persons.

An image capturing area of the camera 14 corresponds to the inspection area such that images of all persons in the inspection area can be captured. It is not necessarily required to capture images of all the persons in the inspection area at once. The camera 14 may be installed on the ceiling via a movable mechanism, and may capture images of all persons in the inspection area several times while changing the image capturing area. It is understood whether a person presents in the inspection area, based on the image of the camera 14. Thus, the primary screening may be started when a person enters into the inspection area.

The purpose of primary screening is to set many people in a wide area as target persons and to determine the degree of danger relating to the possibility that the target person possesses a dangerous article. Therefore, in primary screening, it is not necessary to determine whether the target person possesses a dangerous article, accurately with taking time. It may be possible to detect a suspicious person who may possess a dangerous article. Highly accurate detection is not required for primary screening. Highly accurate detection is required for secondary screening. For example, in primary screening, the reflection intensity of the target person is automatically determined by the apparatus, and a suspicious person who may possess a dangerous article is detected. For this reason, an inexpensive in-vehicle millimeter wave radar can be used as the radar 12.

The accuracy of the inspection is proportional to the number of electromagnetic wave irradiation points per target person. In primary screening, the electromagnetic wave irradiation points per target person is set to several to several tens, and so-called rough scanning is performed. Thus, the time required for the primary screening for many target persons is short.

As shown in FIG. 1B, an inspection location for secondary screening is different from an inspection location for primary screening in many cases. In secondary screening, an area such as ticket gates of stations, check-in counters of airports, baggage inspection areas of airports, escalators and stairs of airports, stations, shopping malls, concert halls, and exhibition halls, which is narrower than the inspection area in primary screening, is set as an inspection area in many cases.

The primary screening system transmits information regarding the suspicious person to the secondary screening system. An operation of secondary screening (irradiation from the radar 16) may be started when the information regarding the suspicious person is received and it is detected that the suspicious person has entered into the image capturing area of the camera 18. Therefore, the inspection area for the primary screening and the inspection area for the secondary screening may be arranged such that a person who leaves the primary screening area enters the secondary screening area after the person leaves the primary screening area. However, the embodiment is not limited thereto. A security guard may look at the detection results of the primary screening system to call and stop a suspicious person and to take the suspicious person to a secondary screening room. In this case, the inspection area of the secondary screening may be randomly set. Furthermore, in an environment in which people do not move, such as in elevators and seats of concert halls, the inspection location for the primary screening may be the same as that for the secondary screening. In this case, the inspection area for secondary screening may be the same as or narrower than the inspection area for primary screening.

The radar 16 and the camera 18 are installed on the ceiling, the wall, or the floor of the inspection area for the secondary screening. The camera 18 is equivalent to the camera 14 of the primary screening system, and captures an image of a person in the inspection area. Instead of the single radar 16, a plurality of radars 16 may be provided for each smaller area in the inspection area.

The radar 16 can perform detection with higher accuracy than that of the radar 12 of the primary screening system. That is, the radar 16 does not determine the degree of danger relating to the possibility that the target person possesses a dangerous article, but specifically determines what the target person possesses. In the secondary screening system, for example, the interval between the irradiation points of the radar 16 is shorter than the interval between the irradiation points of the radar 12. Alternatively, the number of irradiation points of the radar 16 is greater than the number of irradiation points of the radar 12. A scanning direction of the radar 16 is not one-dimensional but two-dimensional, in many cases. The radar 16 may perform high-definition imaging based on the distribution of electromagnetic wave reflection intensity. If imaging is performed in the secondary screening, and what the target person possesses is displayed as an image, it can be determined whether a possessed object is a dangerous article by an operator viewing the image or by analyzing the image. In the primary screening, if the size is equal, a smartphone, a tablet terminal, and the like may be erroneously detected as a handgun. However, in the secondary screening, a smartphone and a tablet terminal can be distinguished from a handgun. The secondary screening is not limited to being performed by the apparatus shown in FIG. 1B, and may be performed by a body touch by a security guard or the like or a security guard with a handy scanner.

Since the target person who is inspected in detail in the secondary screening is limited to the suspicious person detected in the primary screening, the time required for the entirety of two-stage screening is shorter than the time required for inspecting all people in the inspection area for the primary screening in detail.

[Configuration of Apparatus for Primary Screening]

Figure 2:
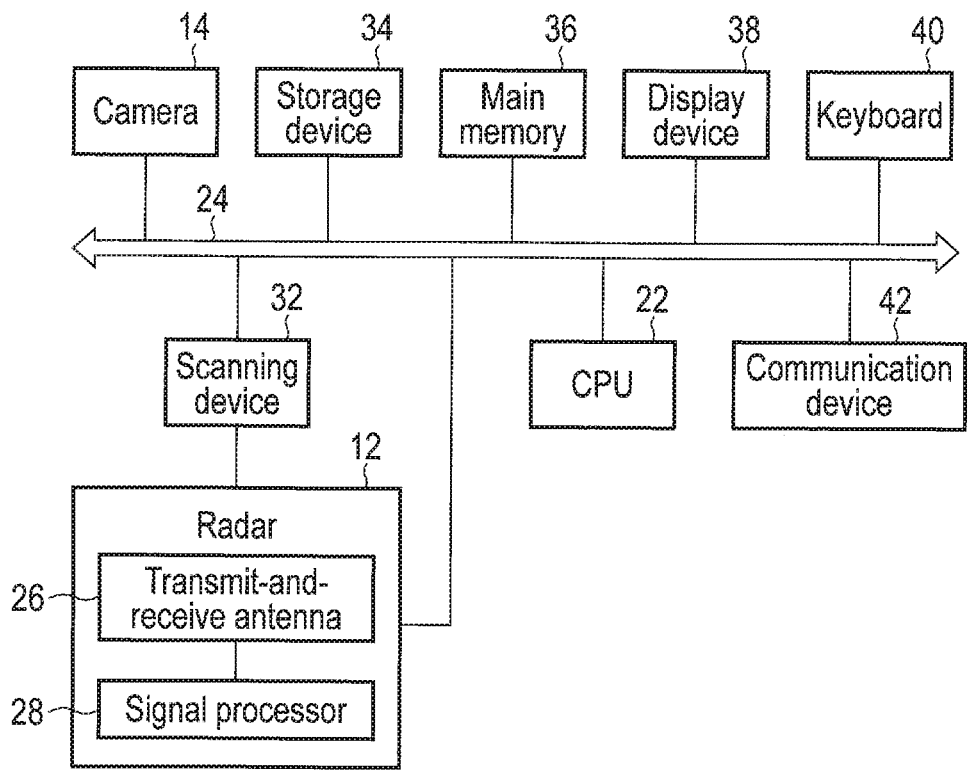
FIG. 2 is a block diagram illustrating an example of an electrical configuration of the system according to the embodiment, which functions as a primary screening system.

FIG. 2 is a block diagram illustrating an example of an electrical configuration of the primary screening system. The primary screening system includes the radar 12 and the camera 14 schematically shown in FIG. 1A. The primary screening system further includes a CPU 22 as a controller that executes a program for screening to control the entirety of screening. The camera 14, a scanning device 32, a storage device 34, a main memory 36, a display device 38, a keyboard 40, and a communication device 42 are connected to a system bus 24 of the CPU 22. Although not shown in FIG. 1A, the scanning device 32 is installed on the ceiling, the wall, or the floor of the inspection area. In the radar 12, the irradiation direction or the position of the irradiation point of electromagnetic wave is changed by the scanning device 32. Thus, a target person or an object held by the target person is scanned with an electromagnetic wave.

The radar 12 includes a transmit-and-receive antenna 26 and a signal processor 28. The signal processor 28 is connected to the system bus 24 of the CPU 22. The transmit-and-receive antenna 26 includes one or more transmit antennas and one or more receive antennas. In a case where a plurality of transmit antennas and a plurality of receive antennas are provided, the irradiation direction or the position of the irradiation point of electromagnetic wave can be electronically changed by an electronic scanning circuit (not shown) provided in the signal processor 28. The mechanical scanning device 32 can be omitted. Further, both the mechanical scanning device 32 and the electronic scanning circuit may be provided. In a case where the camera 14 is installed via a movable mechanism, the movable mechanism is also connected to the system bus 24 of the CPU 22.

The storage device 34 is a non-volatile storage device that stores programs executed by the CPU 22 and various data, and includes an HDD, an SSD, and the like. The main memory 36 is a volatile memory that stores programs and data read from the storage device 34 or stores various data generated during screening. The CPU 22 executes the program that has been read from the storage device 34 and developed in the main memory 36.

The keyboard 40 and the display device 38 are provided as necessary. The keyboard 40 may be provided to input setting information of detection accuracy, adjustment instructions, and the like. The display device 38 may display information such as an image of the detected suspicious person. The communication device 42 transmits the result of the primary screening to the secondary screening system. The result of the primary screening is information for identifying the suspicious person, for example, an image of the person, a characteristic parameter, and a detection time. In a case where the degree of danger is output in a form of multiple values (quite dangerous, moderately dangerous, moderately safe, quite safe, and the like) instead of binary (dangerous or safe) in the primary screening, the communication device 42 may also transmit the degree of danger to the secondary screening system. The secondary screening system may change the detection accuracy or the screening method in accordance with the degree of danger.

Elements in FIG. 2 other than the radar 12, the camera 14, and the scanning device 32 may be realized as a single device for each inspection area, or may be arranged on a network, and be commonly connected to radars 12, cameras 14, and scanning devices 32 in a plurality of inspection areas through the network. The elements in FIG. 2 other than the radar 12, the camera 14, and the scanning device 32 may be implemented as a PC on a desk in a monitoring room. The signal processor 28 may be configured separately from the transmit-and-receive antenna 26. Only the transmit-and-receive antenna 26 may be installed on the ceiling, the wall, or the floor of the inspection area, and the signal processor 28 may be included in the PC.

Figure 3:
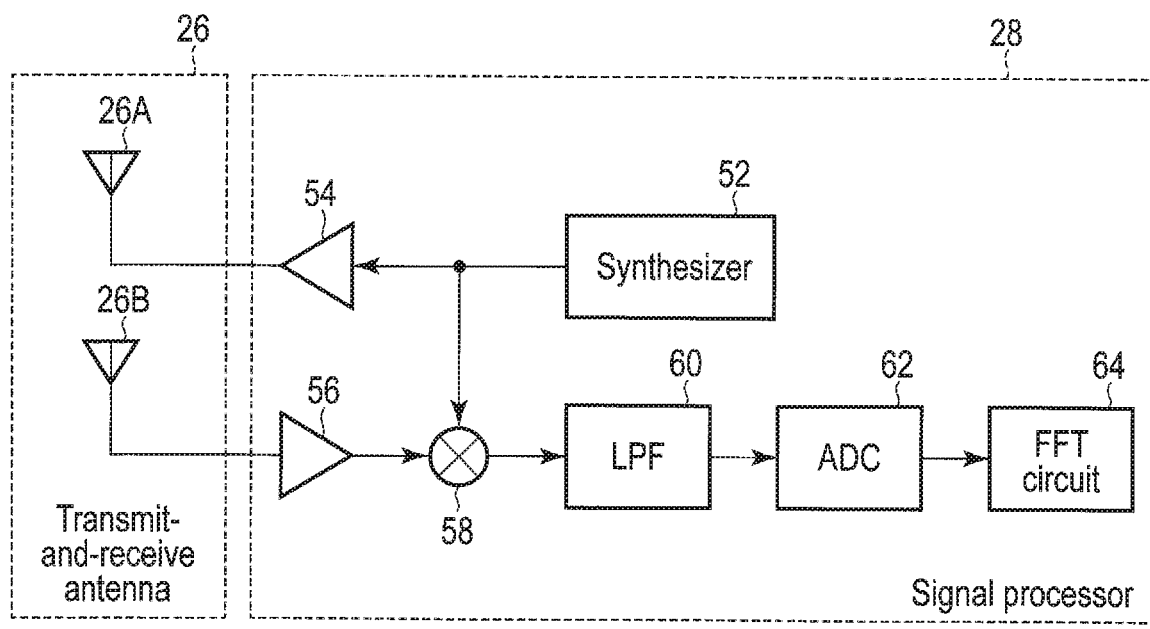
FIG. 3 is a block diagram illustrating an example of an electrical configuration of a radar in the system according to the embodiment.

FIG. 3 is a block diagram illustrating an example of an electrical configuration of the radar 12. The transmit-and-receive antenna 26 includes at least one transmit antenna 26A and at least one receive antenna 26B. The transmit antenna 26A and the receive antenna 26B may not be provided separately, but may perform transmission and reception in one antenna. A signal generated by a synthesizer 52 is amplified by a power amplifier 54. Then, the amplified signal is supplied to the transmit antenna 26A, and thus an electromagnetic wave is irradiated from the transmit antenna 26A to the inspection area. The irradiated electromagnetic wave is reflected by all objects in the inspection area, and the reflected wave is received by the receive antenna 26B. A received signal output from the receive antenna 26B is input to a first input terminal of a mixer 58 through a low noise amplifier 56. An output signal of the synthesizer 52 is input to a second input terminal of the mixer 58.

The mixer 58 mixes the transmit signal from the synthesizer 52 and the received signal from the antenna 28B to generate an intermediate frequency signal. The intermediate frequency signal is input to an A/D converter (ADC) 62 through a low-pass filter (LPF) 60. A digital signal output from the A/D converter 62 is analyzed by a fast Fourier transformation (FFT) circuit 64, and the reflection intensity of electromagnetic wave of the object is obtained as will be described later.

[Detection Principle of Primary Screening]

Figures 4A, 4B:
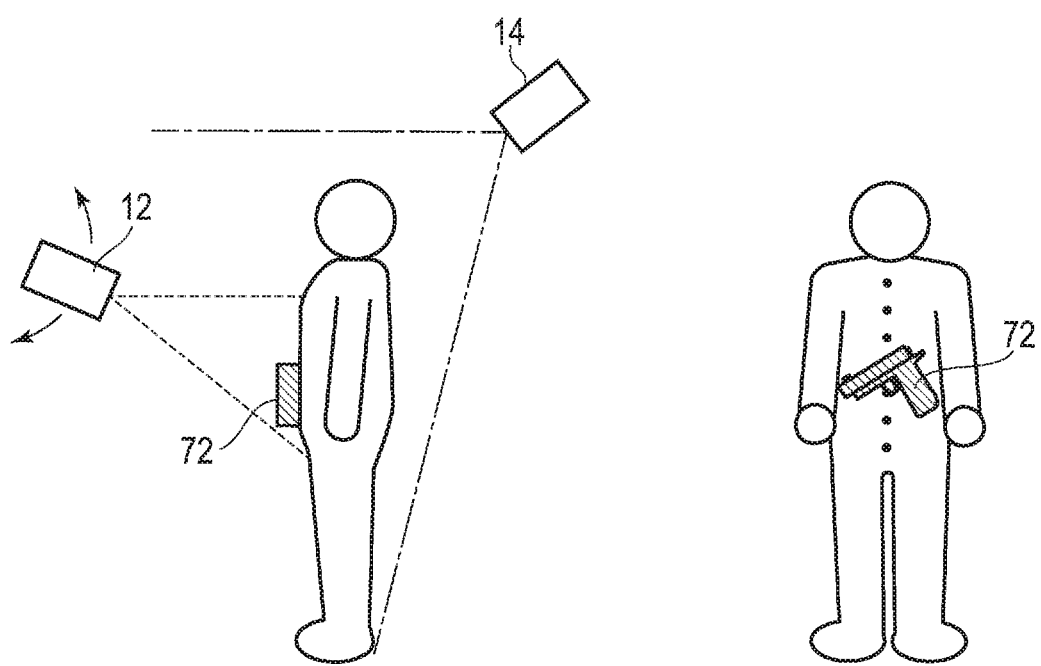
FIGS. 4A and 4B are diagrams illustrating a first example of scanning by the radar.

As described above, in the primary screening, rough scanning is performed with a small number of irradiation points. A scanning range of the primary screening is narrowed down to some of all target persons not to all the target persons in order to determine an object reflecting the electromagnetic wave even with a small number of irradiation points. For this narrowing down, as shown in FIG. 1A, the camera 14 captures images of people in the entirety of the inspection area. An area in which a person presents is extracted from the captured image of the camera 14, and as shown in FIG. 4A, a plurality of persons are targeted one by one. Furthermore, an inspection part in which a dangerous article is likely to be hidden is extracted from the image of the target person. As an example of an inspection part, a body is extracted. Since a dangerous article may be hidden not by the target person, but in an object held by the target person, the object held by the target person may be set as the inspection part. As an example of the object held by the target person, a large bag, suitcase, a case, a rucksack, and a paper bag are selected. The extraction of the person in the image may be performed by any method as long as the person included in the image can be extracted from image information. For example, the extraction of the person is performed by a method including pattern recognition and the like based on movement in the image or a method using AI, machine learning or the like. Extraction of the inspection part of the target person is performed by a method using machine learning.

For easy descriptions, it is assumed that a dangerous article 72 such as a handgun is hidden between the skin of the abdomen and the clothes, and the body is the inspection part.

Further, since the dangerous article have a certain size, the dangerous article can be detected only by scanning one-dimensionally without scanning the inspection part two-dimensionally. For this reason, a scanning line for one-dimensionally scanning the inspection part is specified. For example, a scanning line in a vertical direction, which passes through the center of the body in a width direction is specified. The scanning device 32 is driven such that an electromagnetic wave is irradiated at predetermined intervals along this scanning line, and the irradiation direction of the radar 12 is changed in a sector shape.

During the change of the irradiation direction of the radar 12 by the scanning device 32, an electromagnetic wave is irradiated once or a plurality of times every time the irradiation direction coincides with predetermined irradiation directions. When the electromagnetic wave is irradiated in these directions, irradiation points are arranged at predetermined intervals on the scanning line of the inspection part. Thus, as shown in FIG. 4B, an electromagnetic wave is irradiated to several points at predetermined intervals along the scanning line of the body of the target person. The electromagnetic wave is reflected by all objects on the irradiation path of electromagnetic wave. The received signal output from the receive antenna 26B indicates the reflection intensity of all objects on the irradiation path. Therefore, it is necessary to extract a received signal component by the reflection wave reflected by the target person from a received signal by multiple reflection waves. The reflection wave is received at a time delayed from an irradiation time by a time corresponding to the distance to the object. Therefore, if the distance to the target person is known, it is possible to extract the received signal component by the reflection wave reflected by the target person from the received signal based on a reception timing. In a case where one camera is used, the distance to the target person can be calculated from images with different times and focuses and the like. The distance can also be calculated by using a plurality of cameras.

If the received signal of the reflection wave from the target person is extracted, the reflection intensity of electromagnetic wave is detected from the amplitude, and thus it is possible to detect a person who is suspected of possessing the dangerous article 72.

The detection principle of the radar 12 will be described. Various combinations of transmit-and-receive antennas of the radar 12 are provided. For example, a plurality of receive antennas receive a reflection wave of an electromagnetic wave irradiated from one transmit antenna, one receive antenna receives reflection waves of electromagnetic wave irradiated from a plurality of transmit antennas, or a plurality of receive antennas receive the reflection wave of an electromagnetic wave irradiated from a plurality of transmit antennas. Here, a method of obtaining reflection intensity in a case where one receive antenna receives the reflection wave of electromagnetic wave irradiated from one transmit antenna will be described.

Figure 5A:
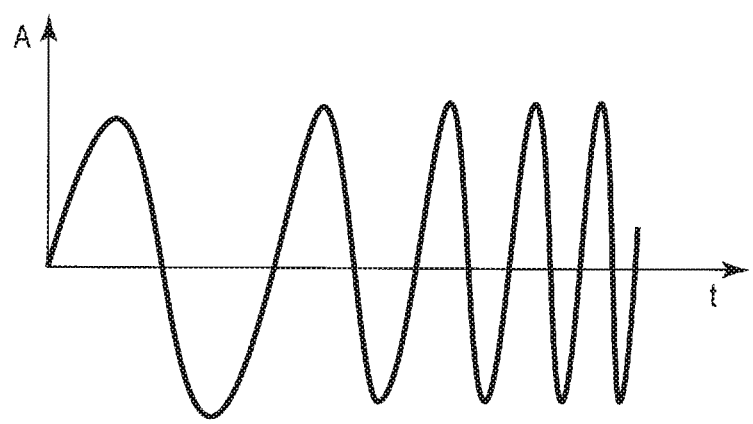
FIGS. 5A and 5B are diagrams illustrating an example of a chirp signal transmitted by the radar.
Figure 5B:
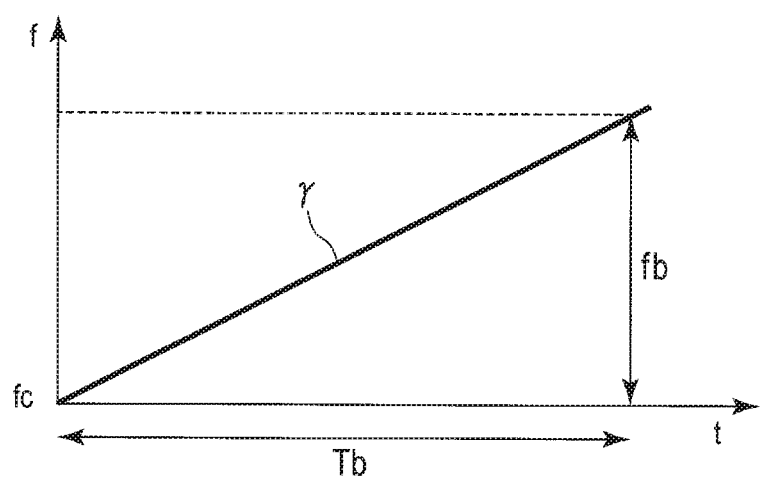

The synthesizer 52 generates a frequency modulated continuous wave (FMCW) having a frequency which increases linearly with time. The FMCW signal is also called a chirp signal. The chirp signal is as shown in FIG. 5A when the amplitude A is expressed as a function of time t, and is as shown in FIG. 5B when the frequency f is expressed as a function of time t. As shown in FIG. 5B, the chirp signal is represented by a center frequency $f_c$, a modulation bandwidth $f_b$, and a signal time width $T_b$. The slope of the chirp signal is called a frequency change rate (chirp rate) γ.

A transmission wave $S_t(t)$ of the FMCW signal radiated from the transmit antenna 26A is represented by Equation 1.

$$S_t(t) = \cos[2\pi(f_c t + \gamma t^2/2)] \qquad \text{Equation 1}$$

The chirp rate γ is represented by Equation 2.

$$\gamma = f_b/T_b \qquad \text{Equation 2}$$

At this time, the reflection wave from a target separated by a distance R from the transmit-and-receive antenna 26 is observed with a delay of $\Delta t = 2R/c$ from a transmission timing. c indicates the speed of light. The received signal $S_r(t)$ is represented by Equation 3 if the reflection intensity of the target is set as "a".

$$S_r(t) = a \cdot \cos[2\pi f_c(t-\Delta t) + \pi\gamma(t-\Delta t)^2] \qquad \text{Equation 3}$$

Figure 6:
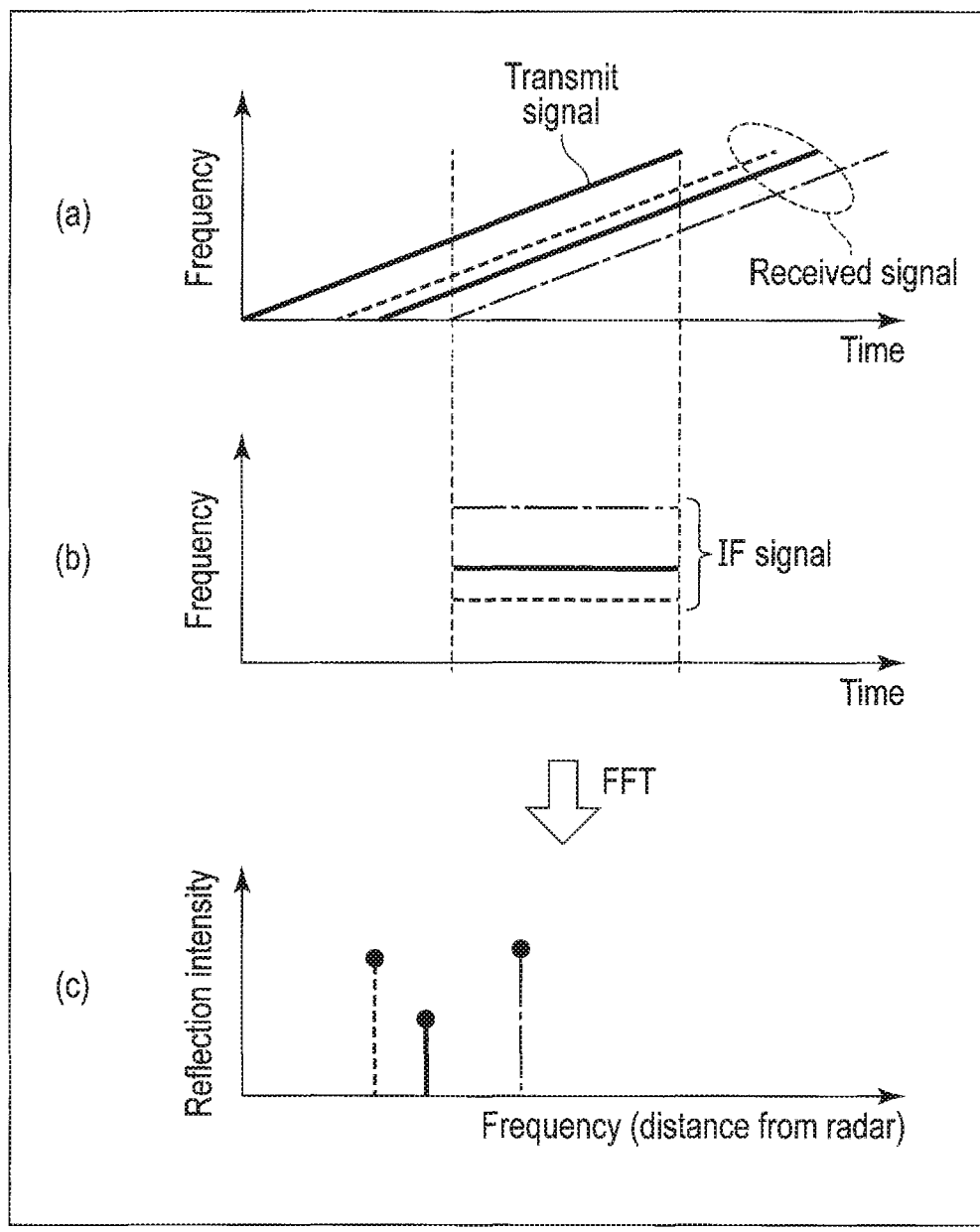
FIG. 6 is a diagram illustrating an example of Fast Fourier Transform (FFT) performed by the radar.

FIG. 6 illustrates the detection principle in a case where a plurality of objects, for example, three objects are present. FIG. 6(a) illustrates a relation between the transmit signal/received signal and time. The frequency of the transmit signal changes linearly with time. The received signal is delayed by Δt with respect to the transmit signal. In a case where a plurality of objects are provided, the reflection wave from the nearest object is received earliest as shown by a broken line, and the reflection wave from the farthest object is received latest as shown by a one-dot chain line.

As shown in FIG. 3, the received signal is mixed with the transmit signal by mixer 58 and the mixed signal is input to the LPF 60. The output signal of the LPF 60 is referred to as an IF signal z(t) and is represented by Equation 4.

$$z(t)=a\cdot\cos(2\pi\Delta t\gamma t) \quad \text{Equation 4}$$

FIG. 6(b) illustrates the relation between the frequency of the IF signal and time. In an ideal environment with no noise or the like, the frequency is constant for each reflection wave. The frequency of the reflection wave from the nearest object is the lowest as shown by the broken line, and the frequency of the reflection wave from the farthest object is the highest as shown by the one-dot chain line.

The reflection intensity in a frequency domain can be calculated by performing FFT of the IF signal z(t) in a time domain, which is represented by Equation 4, in the FFT circuit 64. Thus, the amplitude at each point of the FFT result in the frequency domain corresponds to the reflection intensity for each distance from the radar. The frequency and the distance from the radar have a relation of Equation 5.

$$f_{if}=\Delta t\gamma=2R\gamma/c \quad \text{Equation 5}$$

FIG. 6(c) illustrates the relation between the reflection intensity obtained by performing FFT on the IF signal in the time domain and the frequency. As described above, it is possible to obtain the reflection intensity for each distance from the radar by obtaining the amplitude of the frequency domain signal of the IF signal.

For example, it is assumed that the distance from the radar 12 to the target person is detected as 2 meters from the image information captured by the camera 14. The frequency $f_{if}$ of the IF signal corresponding to the point at the distance R=2 meters is obtained from Equation 5. Therefore, it is possible to extract the reflection intensity at the frequency $f_{if}$ as the reflection intensity of the target person, from the reflection intensity of many received signals as shown in FIG. 6(c).

The above-described processing is performed for each irradiation point in a scanning direction.

Here, as shown in FIGS. 4A and 4B, it is assumed that an electromagnetic wave is irradiated toward several points along the scanning line in the vertical direction at the approximate center of the body of the target person. As shown in FIG. 4B, the reflection intensity of electromagnetic wave of the target person is obtained at several irradiation points. Since the half-value width of electromagnetic wave is about 10 degrees, and the beam width of the radar is sufficiently narrow, the distribution of the reflection intensity of electromagnetic wave on the scanning line varies depending on the substance that reflects the electromagnetic wave as shown in FIGS. 7A to 7C. FIG. 7A illustrates reflection intensity distribution of electromagnetic waves in a case where the target person possesses nothing. In this case, since the electromagnetic wave is reflected by the skin of the target person, the reflection intensity of electromagnetic wave does not change regardless of the position of the irradiation point, and the distribution of the reflection intensity is flat distribution. FIG. 7B illustrates the reflection intensity distribution of electromagnetic wave in a case where the target person possesses a handgun (metal) in the approximate center of the body. In this case, since the reflection intensity of metal is higher than that of the skin, the reflection intensity of electromagnetic wave at the irradiation point corresponding to the position of the handgun is higher than the reflection intensity of electromagnetic wave at other points. Since a horizontal axis indicates the reflection intensity (the right is the higher reflection intensity), the reflection intensity of electromagnetic wave has distribution protruding to the right.

FIG. 7C illustrates the reflection intensity distribution of electromagnetic wave in a case where the target person possesses an explosive at the approximate center of the body. Since the explosive absorbs an electromagnetic wave more than that by the skin, the reflection intensity at the irradiation point corresponding to the position of the explosive is lower than the reflection intensity at other points, and the reflection intensity of electromagnetic wave has a distribution protruding to the left. The distribution can be specified by a difference between values of reflection intensity in at least two points.

According to the embodiment, since it may be possible to determine whether a person possesses an object, a high resolution corresponding to a difference (for example, 1 cm) between the clothes and the body is not required as the resolution in a distance direction. The resolution of about several centimeters is enough. Therefore, an in-vehicle inexpensive millimeter-wave radar that is currently distributed in large quantities can be used as the radar 12 in the embodiment.

As described above, if the reflection intensity of the target person is captured at several (at least two) points on the scanning line, the CPU 22 can determine the degree of danger relating to the possibility that the target person possesses the dangerous article, based on a difference in a distribution shape of the reflection intensity of electromagnetic wave. The CPU 22 may calculate the degree of danger in a binary manner (dangerous or safe), or may obtain the degree of danger with multiple values indicating the degree of danger (for example, quite dangerous, moderately dangerous, moderately safe, quite safe, and the like). The type of the degree of danger to be obtained depends on the operation on how to combine the primary screening and the secondary screening. The CPU 22 can determine the degree of danger with artificial intelligence. As an example of the artificial intelligence, the CPU 22 can determine the degree of danger with machine learning. The CPU 22 may determine the degree of danger using a table. Further, the embodiment is not limited to the determination by the CPU 22, and the degree of danger may be determined by visual observation of the operator. For example, the reflection intensity distribution of electromagnetic wave as shown in FIGS. 7A to 7C may be displayed in the display device 38, and the operator may visually view the shape thereof and determine the degree of danger. Any other method may be used for a determination method of the degree of danger, and the embodiment is not limited to the above-described method.

In a case using machine learning, an arithmetic operation circuit representing a model (neural network or the like) for determining the degree of danger from the reflection intensity of electromagnetic wave at each point is defined. The model includes nodes of multiple stages. A parameter indicating coupling strength for transmitting information between the nodes is defined. The reflection intensity of electromagnetic wave at each point is input to an input stage, and the degree of danger is output from a node at an output stage. In a case of supervised learning, the reflection intensity of electromagnetic wave at each point is input to the arithmetic operation circuit. The parameter is learned such that the degree of danger output from the arithmetic operation circuit approaches the degree of danger as teacher data given by the manufacturer or learning specialist of the screening system.

Various people possessing various kinds of dangerous articles such as handguns and explosives are made to walk in an area having a possibility of being set as the inspection area for the primary screening, such as the concourses and the entrances of airports, stations, shopping malls, concert halls, and exhibition halls or in various locations equivalent to the inspection area in terms of an electromagnetic wave. The reflection intensity distribution of electromagnetic wave for the people is obtained. In this manner, learning of the parameter is performed.

Learning is performed before shipment, and the primary screening system is shipped in a state where the value of the learned parameter is stored in the storage device 34. During screening after shipment, the CPU 22 reads the value of the parameter from the storage device 34 and sets the read value to the value of the parameter in the arithmetic operation circuit. Thus, if the measured reflection intensity of electromagnetic wave is input to the arithmetic operation circuit, the degree of danger is output from the arithmetic operation circuit.

In a case where the primary screening system is operated by the operator, learning may also be performed during screening after shipment. That is, learning may be performed further in a manner that the reflection intensity of electromagnetic wave as shown in FIGS. 7A to 7C may be displayed in the display device 38, and the degree of danger determined by the operator viewing the reflection intensity may be input from the keyboard 40. Alternatively, even in a case where the result of the secondary screening is fed back from the secondary screening system to the primary screening system, learning may be further performed based on the degree of danger output by the arithmetic operation circuit and the secondary screening result.

During machine learning, a synthetic aperture technique or the like may be applied to the reflection intensity of a plurality of electromagnetic waves, which is obtained at a plurality of reflection points, and learning may be performed using reflection intensity with the improved resolution. In addition, as disclosed in U.S. patent application Ser. No. 16/555,381 (Japanese Patent Application No. 2018-214769), the received signals may be synthesized using an array antenna including sparse antenna elements, and thus received signals of antenna elements more than the actual antenna elements may be obtained by calculation in order to enhance the resolution of the received signals. Learning may be performed using the reflection intensity having an improved resolution that is obtained from the calculated received signals.

The above descriptions are provided for a case where one transmit antenna and one receive antenna are provided. Next, a case where a plurality of transmit antennas and a plurality of receive antennas are provided will be described. In a case where N (>1) transmit antennas and M (>1) receive antennas are provided, the N transmit antennas transmit an electromagnetic wave in a time division manner, and the M receive antennas continuously performs reception. If the electromagnetic wave is irradiated from N transmitting antennas in the time division manner for N times in total, reception data in N×M channels is obtained. It is possible to improve the accuracy of determining the degree of danger, by using the reflection intensity of electromagnetic waves from the reception data in a plurality of channels.

Figure 8:
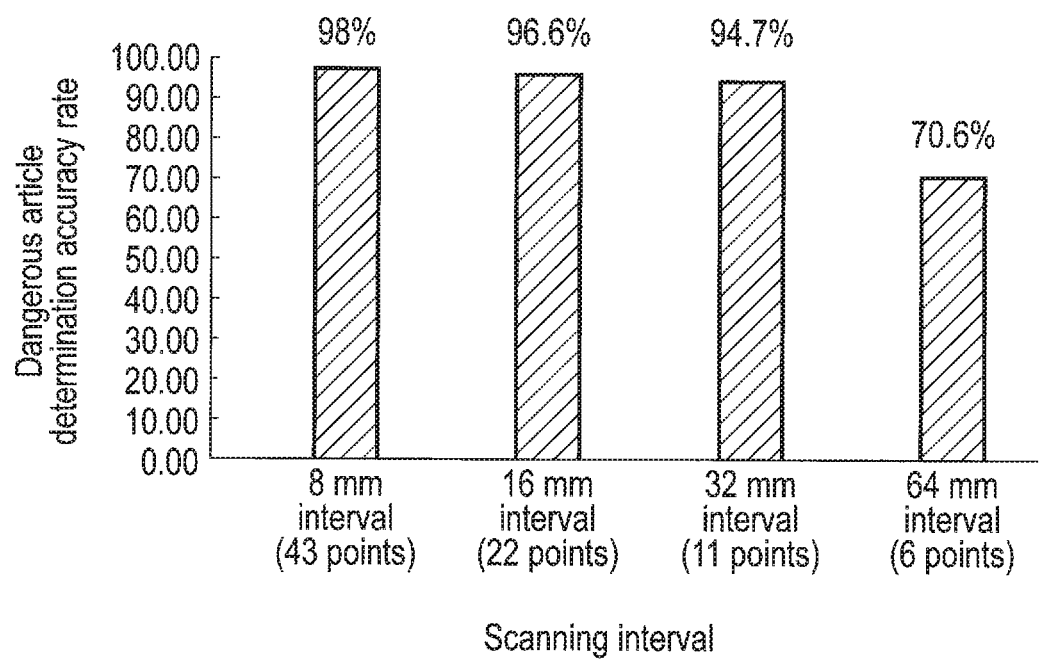
FIG. 8 is a diagram illustrating an example of a determination result of the dangerous article screening according to the embodiment.

FIG. 8 illustrates the result obtained by performing machine learning with a human phantom, according to the embodiment. Regarding a case of only the human phantom, a case of the human phantom and guns, and a case of the human phantom and flour (absorption of electromagnetic wave is considered as being equivalent to that for an explosives), the distance to the human phantom is set at various distances, and an electromagnetic wave is irradiated at various intervals (scanning intervals). The irradiation points on the human phantom are arranged in a one-dimensional direction as shown in FIGS. 4A and 4B. FIG. 8 illustrates comparison of the accuracy rate when the interval between the irradiation points is 8 mm (43 irradiation points), 16 mm (22 irradiation points), 32 mm (11 irradiation points), and 64 mm (6 irradiation points) The wavelength of electromagnetic wave is 4 mm. In the radar, as the interval between the irradiation points becomes as short as possible, the accuracy becomes higher, and the interval between the irradiation points is generally set to be a half wavelength of electromagnetic wave. The interval of 8 mm is four times the half wavelength, which is a rough interval. It is understood that the accuracy rate of 90% or more is obtained even when the interval of the irradiation point is 16 times the half wavelength (32 mm interval), and the accuracy rate is 70% even when the interval of the irradiation point is 32 times (64 mm interval). For this reason, it is possible to determine the degree of danger with accuracy of a certain degree even in the primary screening based on the distribution of the reflection intensity of a few irradiation points.

[Example of Primary Screening]

Figure 9:
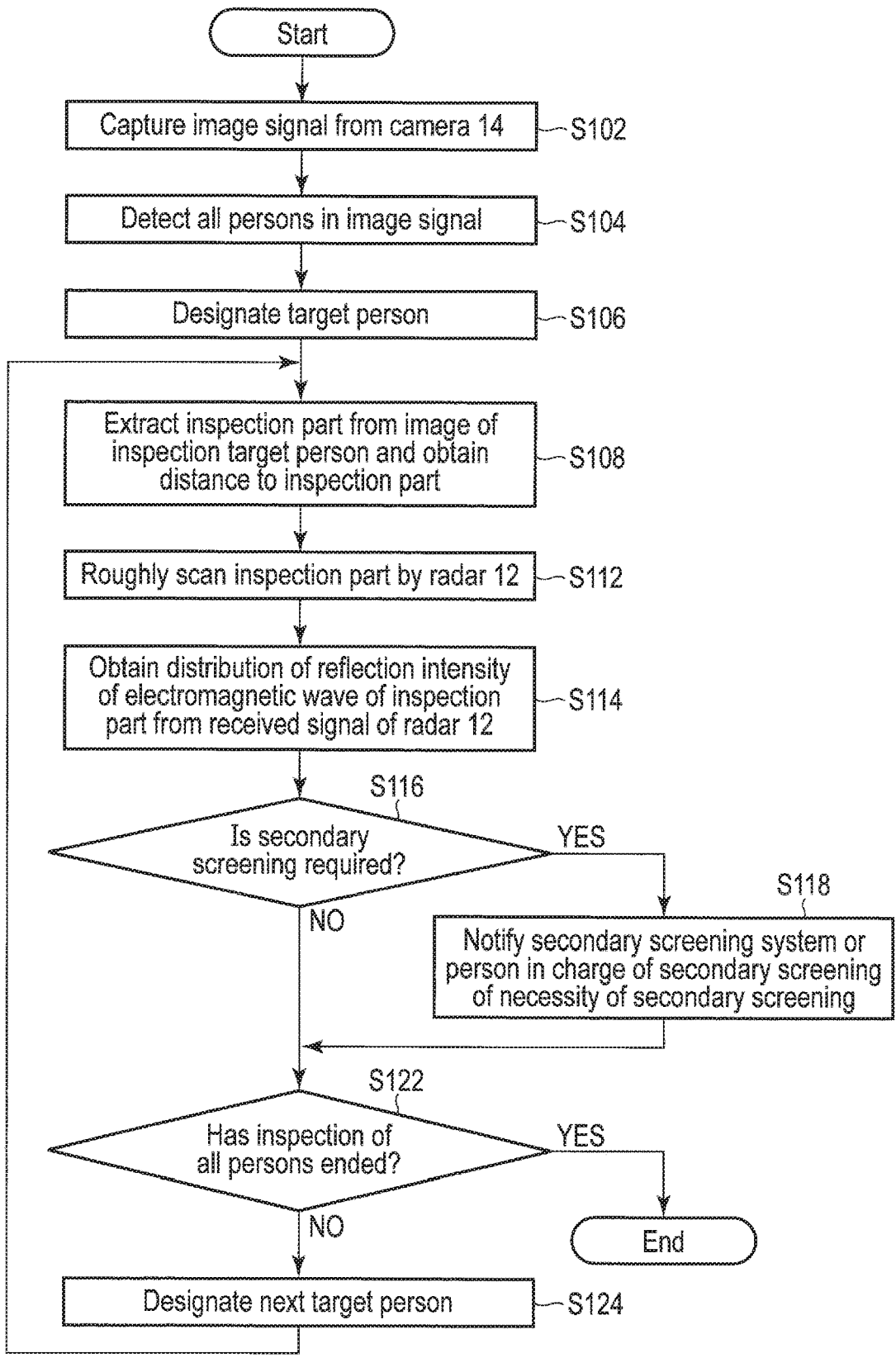
FIG. 9 is a flowchart illustrating an example of primary screening in the system according to the embodiment.

FIG. 9 is a flowchart illustrating an example of a flow of processing in the CPU 22 that executes a screening program.

The CPU 22 captures an image signal from the camera 14 in step S102 at predetermined intervals.

In step S104, the CPU 22 detects all persons appearing in the image.

In step S106, the CPU 22 designates one person as a target person.

In step S108, the CPU 22 extracts a part that is likely to possess a dangerous article from the image of the target person, for example, the body, as an inspection part, and obtains a distance to the inspection part. The reason why the part is set to be an inspection target is to narrow down the irradiation range of electromagnetic wave and to shorten the inspection time. Therefore, depending on the situation, a belonging such as a bag may be extracted as an inspection part. That is, the inspection part may be changed depending on the situation of the inspection area, the target person, and the like. In a case where one camera is used, the distance from the radar 12 to the inspection part is calculated from images captured at different times and focuses and the like. In a case where a plurality of cameras are used, it is possible to obtain the distance based on the parallax of a plurality of images.

In step S112, the CPU 22 drives the scanning device 32 to change the direction of the radar 12. The irradiation direction of the electromagnetic wave changes one-dimensionally along a vertical line (scanning line) passing through the approximate center of the inspection part in the width direction, as shown in FIG. 4B. Then, the inspection part is roughly scanned with an electromagnetic wave. The degree of "rough" means that the interval between the irradiation points is equal to or greater than a half wavelength of electromagnetic wave. Assuming that the wavelength of electromagnetic wave is 4 mm, the half wavelength is 2 mm. In the rough scanning, the interval between irradiation points is equal to or greater than 4 mm (twice the half wavelength).

In step S114, the CPU 22 extracts the component of the received signal by the reflection wave reflected at the distance of the inspection part from the received signals received by the radar 12, and obtains the distribution of the reflection intensity of electromagnetic wave at the inspection part. Information on the distance of the inspection part is obtained in step S108.

In step S116, the CPU 22 reads the value of the learned parameter from the storage device 34, sets the read value to the value of the parameter of the arithmetic operation circuit representing the model for obtaining the degree of danger from the reflection intensity of electromagnetic wave, and inputs the measured reflection intensity to the arithmetic operation circuit. The CPU 22 determines whether secondary screening is required for the target person in accordance with the degree of danger output from the arithmetic operation circuit. In a case where the degree of danger indicating that the possibility that the target person possesses a dangerous article is high is obtained, the CPU 22 determines that the secondary screening is required.

In a case where it is determined that the secondary screening is required, the CPU 22 causes the communication device 42 to notify the secondary screening system or the person in charge of secondary screening of a message indicating that the secondary screening is required, in step S118. The content of the notification includes information for identifying the target person who is determined to require secondary screening, for example, an image of a person, a characteristic parameter, and a detection time. In a case where the primary screening system detects the degree of danger, the secondary screening system may be notified of the degree of danger.

In a case where the CPU 22 determines, in step S116, that the secondary screening is not required, or after step S118, the CPU 22 determines, in step S122, whether or not inspection of all the persons has ended.

If the CPU 22 determines that the inspection of all the persons has ended, the process of FIG. 9 ends. If the CPU 22 determines that an unexamined person remains, the CPU 22 designates a target person to be inspected next among the unexamined persons in step S124, and performs the process of step S108 again.

Thus, according to the embodiment of the primary screening system, it is possible to determine the degree of danger based on the difference of the value of the reflection intensity of electromagnetic wave at several points of the inspection part of the target person. The degree of danger indicates that the possibility that the target person possesses a dangerous article is high. The necessity of secondary screening can be determined based on the degree of danger. If it is determined that the secondary screening is required, the secondary screening system can be notified of information regarding a target person with a certain degree of danger. Thus, it is possible to inspect only the suspicious person in detail by the secondary screening. Accordingly, the screening system that detects the dangerous article by narrowing down in two stages of primary screening and secondary screening is realized.

[Modification Examples of Primary Screening System]

In the flowchart of FIG. 9, the CPU 22 performs step S102 being a start step of screening, at predetermined intervals. However, the CPU 22 may continuously determine whether a person presents in the image captured by the camera 14. When detecting the person, the CPU 22 may designate the person as the target person, and then start the process from the process of extracting the inspection part from the target person in step S108.

In step S108, the CPU 22 obtains the range (distance from the radar to the inspection part) of the reflection wave detected by the radar 12, based on the image captured by the camera 14. However, the embodiment is not limited thereto, and the range may be obtained based on scanning by the radar 12. From the result (FIG. 6(c)) obtained by performing FFT on the received signal obtained by the radar 12 scanning the target person, the distance R at which the reflection intensity of electromagnetic wave is the maximum may be set as the distance from the radar to the inspection part t. Further, the range of the reflection wave may be obtained using another method.

In the above descriptions, the radar 12 is installed on the ceiling, and the sector scanning is performed. A modification example relating to installation of the radar 12 and scanning by the scanning device 32 will be described below.

FIG. 10A illustrates an example in which the radar 12 irradiates an electromagnetic wave to the target person in a horizontal direction from the side of the target person. A guide rail 32a extending in the vertical direction may be installed on the floor of the inspection area or along the wall of the inspection area. A slider 32b is attached to the guide rail 32a to be slidable. The radar 12 is attached to the slider 32b to irradiate an electromagnetic wave in the horizontal direction. The scanning device 32 slides the slider 32b in the vertical direction along the guide rail 32a.

Thus, the radar 12 that irradiates an electromagnetic wave in the horizontal direction moves up and down in the vertical direction, and linear scanning of the inspection part of the target person is performed. As a result, similarly to the example of FIGS. 4A and 4B, an electromagnetic wave can be irradiated to several points along the scanning line in the vertical direction, which passes through the approximate center of the body of the target person in the width direction.

In FIGS. 4A, 4B, and 10A, for easy descriptions, the target person is arranged in front of the radar 12. However, since the target person often moves, it cannot be guaranteed that the target person is arranged in front of the radar 12. Even though the target person shifts from the front of the radar 12, the degree of danger of the target person can be determined so long as the electromagnetic wave is irradiated to the dangerous article 72, and the reflection wave from the dangerous article 72 is received by the receive antenna.

FIG. 10B illustrates another example in which the radar 12 can perform sector scanning in the horizontal plane such that the electromagnetic wave is reflected by the dangerous article 72 and the degree of danger can be determined even if the target person moves. FIG. 10B is a diagram when the radar 12 and the slider 32b are viewed from the top. The radar 12 is attached to the slider 32b to be rotatable in a horizontal plane around an axis a1 parallel to the guide rail 32a. The scanning device 32 slides the slider 32b in the vertical direction and rotates the radar 12 in the horizontal plane. Even in a case where the target person moves, it is possible to irradiate the electromagnetic wave toward the target person by rotating the radar 12 in the horizontal plane by the scanning device 32.

FIG. 11 illustrates an example in which the radar 12 is installed on the side of the target person. A two-dimensional array antenna 74 in which transmit-and-receive antenna elements 76 equivalent to the transmit-and-receive antennas 26 of the radar 12 are two-dimensionally arranged may be installed on the wall of the inspection area. The two-dimensional array antenna 74 may be installed on the floor of the inspection area to be perpendicular to the floor. The two-dimensional array antenna 74 is connected to a signal processor (not shown) equivalent to the signal processor 28 shown in FIG. 3.

When the two-dimensional array antenna 74 is used, the electromagnetic wave can be transmitted from one of the antenna elements 76, a reflection wave can be received by the one of the antenna elements 76. The one of the antenna elements 76 that transmits the electromagnetic wave can be sequentially changed. If the transmitting antenna element 76 is changed along a the scanning line in the vertical direction which passes through the approximate center of the body of the target person in the width direction, the electromagnetic wave can be irradiated to several points along the scanning line, similarly to the example of FIGS. 4A and 4B.

If beam forming is performed using a plurality of antenna elements 76, the irradiation direction of the electromagnetic wave can be electrically changed to any direction.

Figure 12:
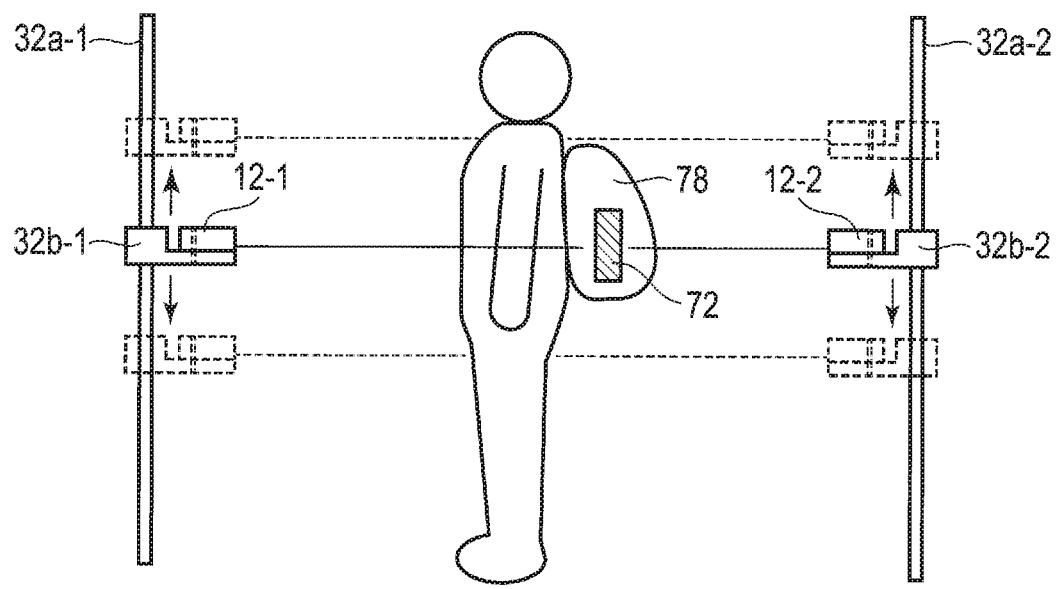
FIG. 12 is a diagram illustrating a fourth example of the scanning by the radar.

Radars corresponding to the radar 12 shown in FIGS. 4A, 10A, and 10B or two-dimensional array antennas corresponding to the two-dimensional array antenna 74 shown in FIG. 11 may be installed in a plurality of directions of the target person. FIG. 12 illustrates an example in which the radars 12-1 and 12-2 shown in FIGS. 10A and 10B are installed on the front and the rear of the target person, as an example. In FIGS. 4A, 4B, 10A, 10B, and 11, it is assumed that the target person hides a dangerous article on the abdomen. Therefore, the electromagnetic wave is irradiated from the front to the target person. In FIG. 12, it is assumed that the target person hides the dangerous article at locations other than the abdomen. It is assumed that the target person carries the rucksack 78 and hides the dangerous article 72 in the rucksack 78. In this case, the electromagnetic wave irradiated from the front of the target person is reflected by the chest of the target person and is not easily irradiated to the dangerous article 72 in the rucksack 78. However, the electromagnetic wave irradiated from the rear of the target person is irradiated to the dangerous article 72 in the rucksack 78, and the reflection wave from the dangerous article 72 is received by the radar 12.

Therefore, a guide rail 32a-1 is installed on the floor in front (or rear) of the inspection area, and a guide rail 32a-2 is installed on the floor on the rear (or front) of the inspection area. The guide rails 32a-1 and 32a-2 may be installed along the front and the rear walls of the inspection area. A slider 32b-1 is attached to the guide rail 32a-1 and a slider 32b-2 is attached to the guide rail 32a-2. The radar 12-1 is attached to the slider 32b-1 to irradiate an electromagnetic wave in the horizontal direction from the front of the inspection area. The radar 12-2 is attached to the slider 32b-2 to irradiate an electromagnetic wave in the horizontal direction from the rear of the inspection area. The scanning device 32 slides the sliders 32b-1 and 32b-2 in the vertical direction along the guide rails 32a-1 and 32a-2.

Thus, the radars 12-1 and 12-2 that irradiate an electromagnetic wave in the horizontal direction move up and down in the vertical direction, and linear scanning of the inspection part of the target person is performed. As a result, similarly to the example of FIGS. 4A and 4B, an electromagnetic wave can be irradiated to several points of the body of the target person from at least one of the radars 12-1 and 12-2 along the scanning line in the vertical direction, which passes through the approximate center in the width direction. Since it can be determined from the image captured by the camera 14 that the target person is carrying the rucksack 78, the radar 12-1 or 12-2 that irradiates the electromagnetic wave may be selected in accordance with the state of the target person.

Although not shown, as in FIG. 10B, the radar 12-1 is attached to the slider 32b-1 to be rotatable in the horizontal plane around an axis parallel to the guide rail 32a-1. The radar 12-2 is attached to the slider 32b-2 to be rotatable in the horizontal plane around an axis parallel to the guide rail 32a-2. Thus, the radars 12-1 and 12-2 are rotated in the horizontal plane by the scanning device 32, and the sector scanning is performed in the horizontal plane.

Figure 13:
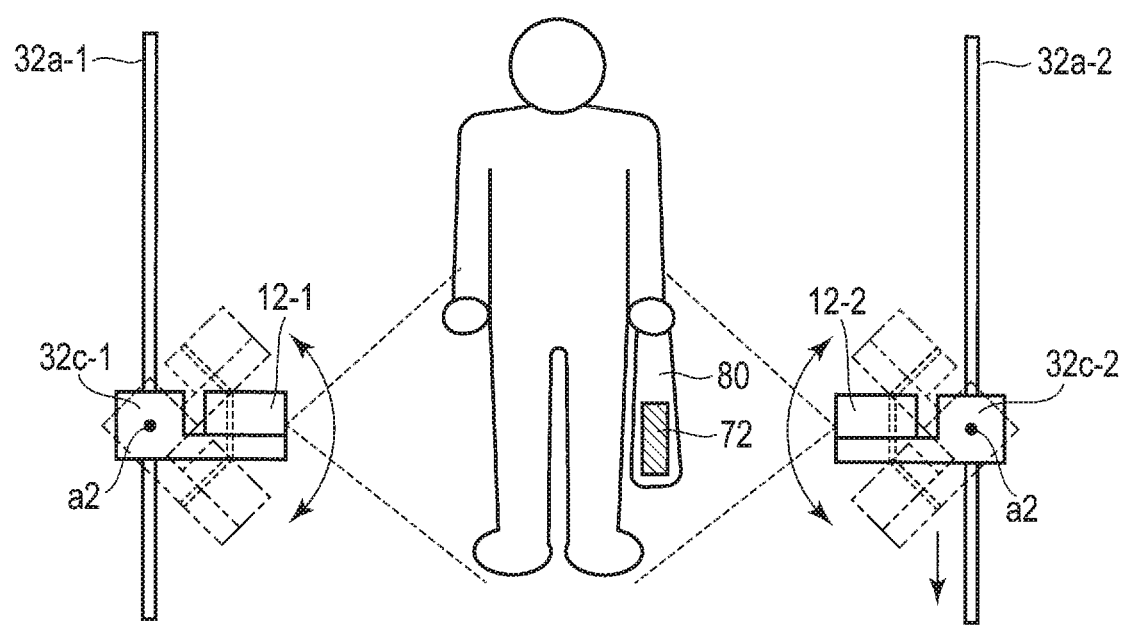
FIG. 13 is a diagram illustrating a fifth example of the scanning by the radar.

FIG. 13 illustrates an example in which the radars 12-1 and 12-2 shown in FIGS. 10A and 10B are arranged in the right (or left) and the left (or right) of the target person. It is assumed that the target person carries a bag 80 in the hand and hides the dangerous article 72 in the bag 80. The intensity of a reflection wave of the electromagnetic wave irradiated from the side by the dangerous article 72 is higher than the intensity of the reflection wave of the electromagnetic wave irradiated from the front (or rear) by the dangerous article 72.

The guide rails 32a-1 and 32a-2 are installed on the right and left floors of the inspection area. The guide rails 32a-1 and 32a-2 may be installed along the right and left walls of the inspection area. Sliders 32c-1 and 32c-2 are attached to the guide rails 32a-1 and 32a-2 to be slidable. The sliders 32c-1 and 32c-2 are rotatable about an axis a2 orthogonal to the guide rails 32a-1 and 32a-2. The radars 12-1 and 12-2 are attached to the sliders 32c-1 and 32c-2, respectively, to irradiate an electromagnetic wave to the inspection area in the horizontal direction. The scanning device 32 slides the sliders 32b-1 and 32b-2 in the vertical direction along the guide rails 32a-1 and 32a-2.

Thus, the radars 12-1 and 12-2 that irradiate an electromagnetic wave in the horizontal direction move up and down in the vertical direction, and linear scanning is performed. As a result, similarly to the example of FIG. 12, an electromagnetic wave can be irradiated to several points from at least one of the radars 12-1 and 12-2 along the scanning line in the vertical direction, which passes through the center in a front-rear direction of the bag 80 carried by the target person. Since the state, for example, where the target person carries the bag 80 with either hand can be determined from the image captured by the camera 14, the radar 12-1 or 12-2 that irradiates an electromagnetic wave may be selected in accordance with the state of the target person.

Since the sliders 32c-1 and 32c-2 are rotatable about the axis a2 orthogonal to the guide rails 32a-1 and 32a-2, the scanning device 32 may not slide the sliders 32c-1 and 32c-2 in the vertical direction, but may rotate the sliders 32c-1 and 32c-2 around the axis a2. If the sliders 32c-1 and 32c-2 are rotated, sector scanning is performed on the target person in a vertical plane.

Although not shown, similar to FIG. 10B, the radars 12-1 and 12-2 are attached to the sliders 32c-1 and 32c-2 to be rotatable in the horizontal plane around the axis parallel to the guide rails 32a-1 and 32a-2. Thus, the radars 12-1 and 12-2 are rotated in the horizontal plane, and the sector scanning is performed in the horizontal plane.

If the linear scanning in the vertical direction, the sector scanning in the vertical plane, and the sector scanning in the horizontal plane are combined, a possibility that an electromagnetic wave is reflected by the dangerous article increases regardless of the direction of the target person.

A sector scanning mechanism in the vertical plane shown in FIG. 13 may be provided in the slider shown in FIGS. 10A, 10B, and 12.

The examples in FIGS. 10A, 10B, 12, and 13 are examples in which one radar 12 is attached to one slider 32. A modification example in which a plurality of radars 12 are attached to one slider 32 will be described with reference to FIGS. 14A and 14B. FIG. 14A illustrates a modification example of FIGS. 10A, 10B, and 12. FIG. 14B illustrates a modification example of FIG. 13.

In the example of FIG. 14A, a plurality of, for example, four radars 12a, 12b, 12c, and 12d are attached to a slider 32d. The slider 32d has the same configuration as the slider 32b shown in FIG. 10A or the slider 32b-1 or 32b-2 shown in FIG. 12, but the number of radars 12 to be mounted is different. The slider 32d is slidable in the vertical direction along the guide rail 32. However, in a case where the length of the inspection part is small, and four irradiation points are enough, sliding of the slider 32d in the vertical direction is not required. In a case where the slider 32d is slid, the pitch of the slide may be a length corresponding to the height of the slider 32d having the four radars 12a, 12b 12c, and 12d. As described above, if a plurality of radars 12 are attached to the slider 32d, an electromagnetic wave can be irradiated to a plurality of points at a time. Thus, it is possible to scan the inspection part in a short time. Further, as shown in FIG. 10B, the radars 12a, 12b, 12c, and 12d may be attached to the slider 32d to be rotatable in the horizontal plane around the axis parallel to the guide rail 32.

In the example of FIG. 14B, a plurality of, for example, four radars 12a, 12b, 12c, and 12d are attached to a slider 32e. The slider 32e has the same configuration as the slider 32c shown in FIG. 13, and the number of mounted radars 12 is different. The slider 32e is slidable in the vertical direction along the guide rail 32. However, in a case where the length of the inspection part is small, and four irradiation points are enough, sliding of the slider 32e is not required. In a case where the slider 32e is slid, the pitch is a length corresponding to the height of the slider 32e having the four radars 12a, 12b 12c, and 12d. Instead of sliding in the vertical direction, the slider 32e may be rotated about the axis a2. Sector scanning is performed on the target person in the vertical plane by rotation of the slider 32e. As described above, if a plurality of radars 12 are attached to the slider 32e, an electromagnetic wave can be irradiated to a plurality of points at a time. Thus, it is possible to scan the inspection part in a short time. Further, as shown in FIG. 10B, the radars 12a, 12b, 12c, and 12d may be attached to the slider 32e to be rotatable in the horizontal plane around the axis parallel to the guide rail 32.

Figure 15A:
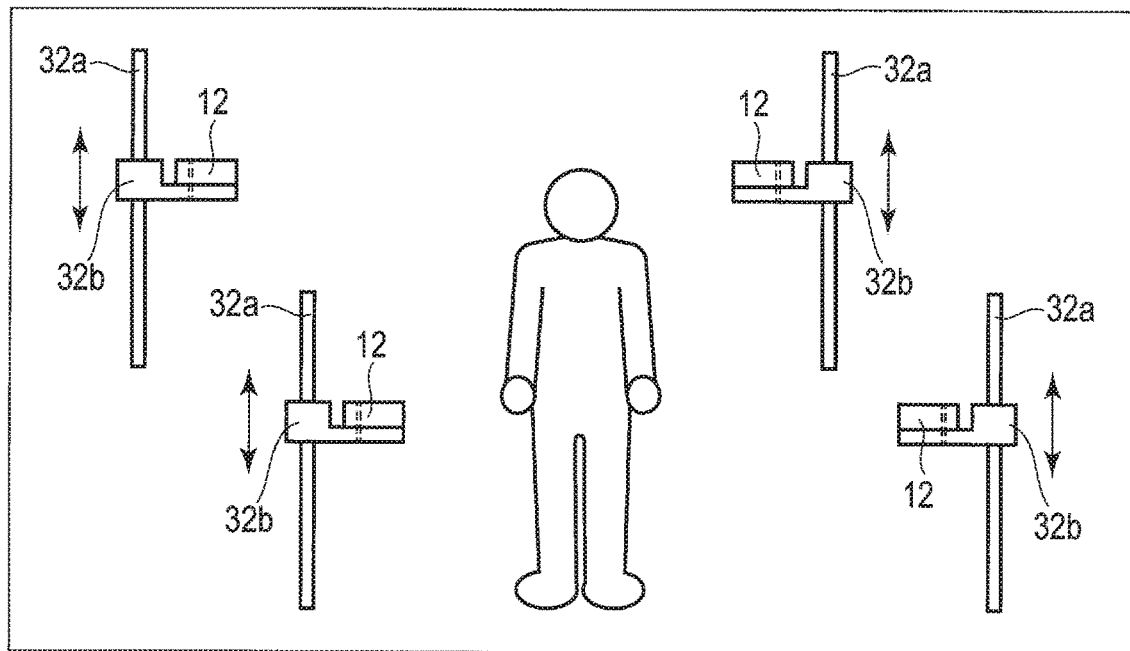
FIGS. 15A and 15B are diagrams illustrating a seventh example of the scanning by the radar.

In FIGS. 12 and 13, guide rails 32a-1 and 32a-2 are installed in the front and rear or in the right and left of the inspection area. However, the number of guide rails 32a installed in the front and rear or in the right and left of the inspection area may be two or more. FIG. 15A illustrates an example in which two guide rails 32a are arranged on the front and rear or on the right and left of the inspection area. The two guide rails 32a arranged at the front, rear, left or right of the inspection area may have different linear scanning ranges. For example, the slider 32b attached to the first guide rail 32a performs linear scanning in a range from the floor to 1 m above the floor, and the slider 32b attached to the second guide rail 32a performs linear scanning in a range from 90 cm above the floor to 2 m above the floor. As the slider 32b in FIG. 15A, any of the sliders in FIGS. 10A, 10B, 12, 13, 14A, and 14B may be used.

Figure 15B:
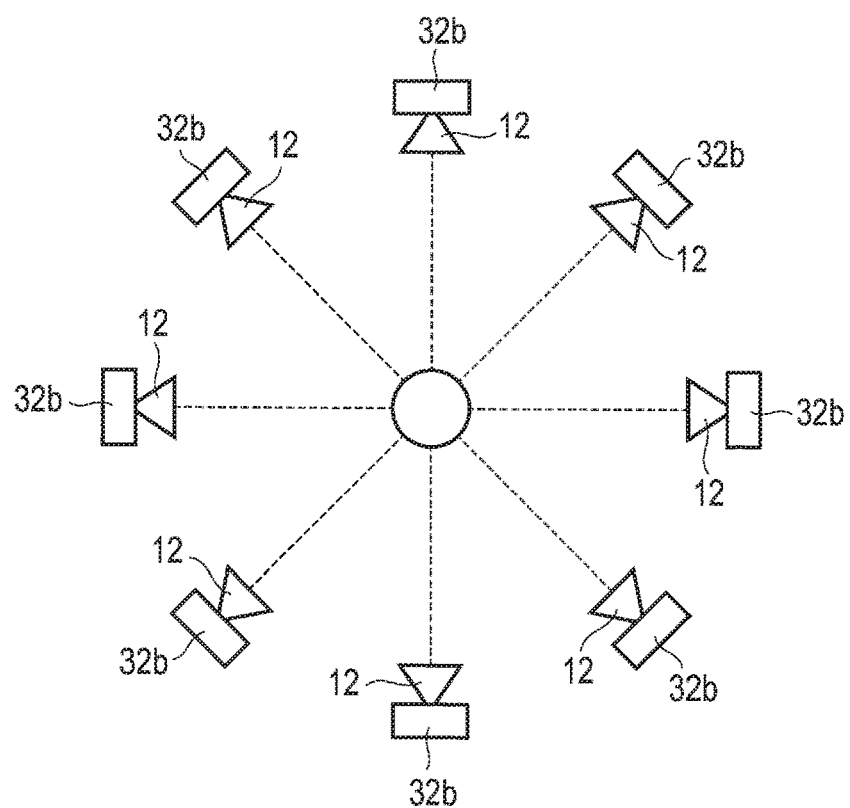

FIG. 15B is a plan view illustrating an example in a case where multiple sliders 32b (guide rails 32a) are provided evenly around the inspection area. In this example, sliders 32b (guide rails 32a) are arranged in eight directions in total, that is, four directions on the front, rear, left and right of the inspection area, and an oblique direction intermediate between two adjacent directions in the four directions. Thus, regardless of which direction the target person is directed, any one of the radars 12 can receive the reflection wave from the dangerous article. As the slider 32b in FIG. 15B, any of the sliders in FIGS. 10A, 10B, 12, 13, 14A, and 14B may be used.

As shown in FIGS. 15A and 15B, in a case where a plurality of radars 12 are arranged in the inspection area, the radars 12 and the scanning devices 32 are connected to one CPU 22 and controlled in synchronization. The radars 12 irradiate an electromagnetic wave in a time-division manner and continuously perform reception. Thus, data in a plurality of channels can be received at a time. Since the positions of the radars with respect to the target person are different, the reflection intensity at different incident angles with respect to the dangerous article is obtained, and the determination accuracy of the degree of danger is improved.

As shown in FIGS. 15A and 15B, if a plurality of inspection apparatuses are provided in the inspection area for primary screening, it is possible to simultaneously inspect a plurality of target persons, and to reduce the inspection time for primary screening more.

In FIGS. 10A, 10B, and 12 to 15B, the guide rail 32 is arranged to extend in the vertical direction. However, the direction of the guide rail 32 extending is not limited to the vertical direction, and may be the horizontal direction or an oblique direction.

FIGS. 16A to 16G illustrate other modification examples of the scanning line according to the embodiment. FIGS. 16A to 16G are views when the target person is viewed from the front.

FIG. 16A illustrates an example in which the body is linearly scanned along one oblique scanning line. The oblique scanning lines may be a scanning line connecting the lower right and upper left of the body or a scanning line connecting the lower left and upper right of the body. The scanning direction may be from the bottom to the top or from the top to the bottom.

FIG. 16B illustrates an example in which the body is linearly scanned along two intersecting oblique scanning lines. The oblique scanning lines may be a scanning line connecting the lower right and upper left of the body and a scanning line connecting the lower left and upper right of the body. The scanning direction may be from the bottom to the top or from the top to the bottom.

FIG. 16C illustrates an example in which linear scanning is performed on the body along two scanning lines in the vertical direction. The scanning direction may be from the bottom to the top or from the top to the bottom.

FIG. 16D illustrates an example in which linear scanning is performed on the body along one scanning line in the horizontal direction. The scanning direction may be right to left or left to right.

FIG. 16E illustrates an example in which linear scanning is performed on the body along two scanning lines in the horizontal direction. The scanning direction may be right to left or left to right.

In order to realize scanning in FIGS. 16A to 16E, the guide rail 32a shown in FIGS. 10A, 10B, and 12 to 15B may be installed in the same direction as the direction of the scanning line, and the radar 12 may be slid along the guide rail 32a or the direction of the radar 12 may be rotated. Alternatively, in a case where the two-dimensional array antenna 74 shown in FIG. 11 is used, the antenna element 76 used for transmission and reception may be selected along the scanning line.

FIG. 16F illustrates an example in which an electromagnetic wave is irradiated to a plurality of points selected randomly within the body. In order to realize this, the antenna element 76 used for transmission and reception may be selected in accordance with the position of the irradiation point, by using the two-dimensional array antenna 74 shown in FIG. 11.

FIG. 16G illustrates an example in which an electromagnetic wave is irradiated to a plurality of points at predetermined intervals in the body. In order to realize this, the antenna element 76 used for transmission and reception may be selected in accordance with the position of the irradiation points, by using the two-dimensional array antenna 74 shown in FIG. 11. Alternatively, in a case where the guide rail 32a shown in FIGS. 10A, 10B, and 12 to 15B is used, a plurality of guide rails 32a may be installed in the vertical direction or the horizontal direction.

[Secondary Screening System]

FIG. 17 illustrates an example of the configuration of the secondary screening system. The secondary screening system includes an array antenna 114A disposed to face a target person 126, a detection device 112 connected to the array antenna 114A, and a display device 118 connected to the detection device 112. The array antenna 114A is included in the radar 16 shown in FIG. 1B. However, FIG. 17 illustrates an example in which the array antenna 114A is installed on the side surface instead of the ceiling of the inspection area. The array antenna 114A is a two-dimensional array antenna including a plurality of antenna elements 116 arranged two-dimensionally on a rectangular (here, square as an example) substrate. The substrate is arranged in an X-Y plane. The size of the substrate is a size that covers the target person 126. An electromagnetic wave is irradiated from each of the antenna elements 116 in a Z-direction orthogonal to the substrate.

The detection device 112 can obtain an image of the target person 126 in a plane 124. The plane 124 is in a three-dimensional inspection space 122 arranged in the transmission direction of the electromagnetic wave from the array antenna 114A and is parallel to the array antenna 114A. The position of the plane 124 in which the image is obtained depends on the time from transmission to reception of electromagnetic wave. It is possible to obtain a three-dimensional image of the target person 126 by setting the time from transmission to reception of electromagnetic wave in accordance with the positions of multiple planes 124 in the three-dimensional space 122, and obtaining the image of the multiple planes 124 having different positions. If a one-dimensional array antenna in which a plurality of antenna elements are arranged on a one-dimensional line (for example, line in an X-direction) is used as an array antenna, it is not possible to obtain the three-dimensional image. However, it is possible to obtain a two-dimensional image of the object in the X-Z plane extending in the irradiation direction of electromagnetic wave in a case where the one-dimensional array antenna is included.

Although details will be described later with reference to FIG. 18, the array antenna 114A may include a first sub-array antenna and a second sub-array antenna that are mixed on the substrate and have different antenna element intervals. Most of the antenna elements 116 are components of the first sub-array antenna or the second sub-array antenna, but some antenna elements 116 are components common to the first sub-array antenna and the second sub-array antenna.

The antenna element interval of a general array antenna is an approximately half wavelength (for easy descriptions, this array antenna may be referred to as a half wavelength array antenna below). However, the antenna element interval of the first sub-array antenna is a positive integer multiple of two or more of the approximately half wavelength. The antenna element interval of the second sub-array antenna is a positive integer multiple of two or more of the approximately half wavelength. The antenna element interval of the first sub-array antenna may be different from the antenna element interval of the second sub-array antenna or the antenna element interval of the first sub-array antenna and the antenna element interval of the second sub-array antenna may be the same. As described above, the array antenna 114A includes the sparse first sub-array antenna and the sparse second sub-array antenna in which the antenna element interval is larger than the approximately half wavelength, and the antenna elements are sparsely arranged. For the sake of convenience, the first sub-array antenna and the second sub-array antenna may be referred to as coprime array antennas. In the coprime array antennas, the antenna element interval (correctly, value obtained by dividing the element interval by the approximately half wavelength) is coprime.

The detection device 112 includes a transmitter 132 and a receiver 134 connected to each antenna element 116. The transmitters 132 or the receivers 134 may be used to correspond to the number of the antenna elements 116, and the transmitters 132 or the receivers 134 may be connected to the antenna elements 116, respectively. The transmitters 132 or the receivers 134 may be used to correspond to a value smaller than the number of the antenna elements 116, and the transmitters 132 or the receivers 134 may be commonly connected to a plurality of antenna elements 116 through a selector.

A transmission and reception method of the array antenna includes the mono-static method in which transmission and reception are performed by the same antenna element and the bi-static method or the multi-static method in which transmission and reception are performed by separate antenna elements. In the bi-static method, an electromagnetic wave is transmitted from one antenna element and is received by another antenna element. In the multi-static method, an electromagnetic wave is transmitted from one antenna element and received by a plurality of other antenna elements. Here, assuming that the mono-static method is employed, each antenna element 116 is a transmit-and-receive antenna element.

The transmitter 132 and the receiver 134 are controlled by a controller 140 including a CPU and the like. The transmitter 132 and the receiver 134 are connected to the controller 140 by wire or wireless. The controller 140 controls the transmission frequency and bandwidth of the transmitter 132, and the transmission timing for each sub-array antenna and each antenna element 116, and controls the reception timing (time from transmission to reception) of the receiver 134 for each sub-array antenna and each antenna element 116. A received signal of one antenna element 116 corresponds to an image signal of one pixel for the target person 126. The controller 140 sequentially changes (also refers scans) the antenna elements 116 for each sub-array antenna and changes the reception timing. A reflection wave (by the target person 126) of the electromagnetic wave transmitted from each antenna element 116 is received by the antenna element 116 that has transmitted the electromagnetic wave.

The received signal received by the receiver 134 is supplied to an image generation circuit 136, and thus a first image signal indicating a three-dimensional image of the target person 126 based on the received signal of the first sub-array antenna and a second image signal indicating a three-dimensional image of the target person 126 based on the received signal of the second sub-array antenna. As an image reconstruction algorithm of the image generation circuit 136, a time domain method, a frequency domain method, or any other algorithm can be used.

The first image signal and the second image signal are supplied to the image processing circuit 138, and the first image signal and the second image signal are combined to generate a synthetic image signal. The image generation circuit 136 and an image processing circuit 138 are also controlled by the controller 140. The image generation circuit 136 and the image processing circuit 138 are connected to each other by wire or wirelessly. The receiver 134 and the image generation circuit 136 are connected to each other by wire or wirelessly. The synthetic image signal is supplied to the display device 118. A synthetic image is displayed in the display device 118. It is possible to detect that the target person 126 possesses a dangerous article (for example, gun) 128, by the operator observing the image. The image processing circuit 138 and the display device 118 are connected to each other by wire or wireless.

The detection device 112 includes a communication device 141 connected to the controller 140. The communication device 141 communicates with the communication device 42 of the primary screening system shown in FIG. 2 to receive information that has been transmitted from the communication device 42 and is for identifying the target person determined to require the secondary screening and to receive the degree of danger. The camera 18 shown in FIG. 1B is connected to the controller 140.

Figure 18:
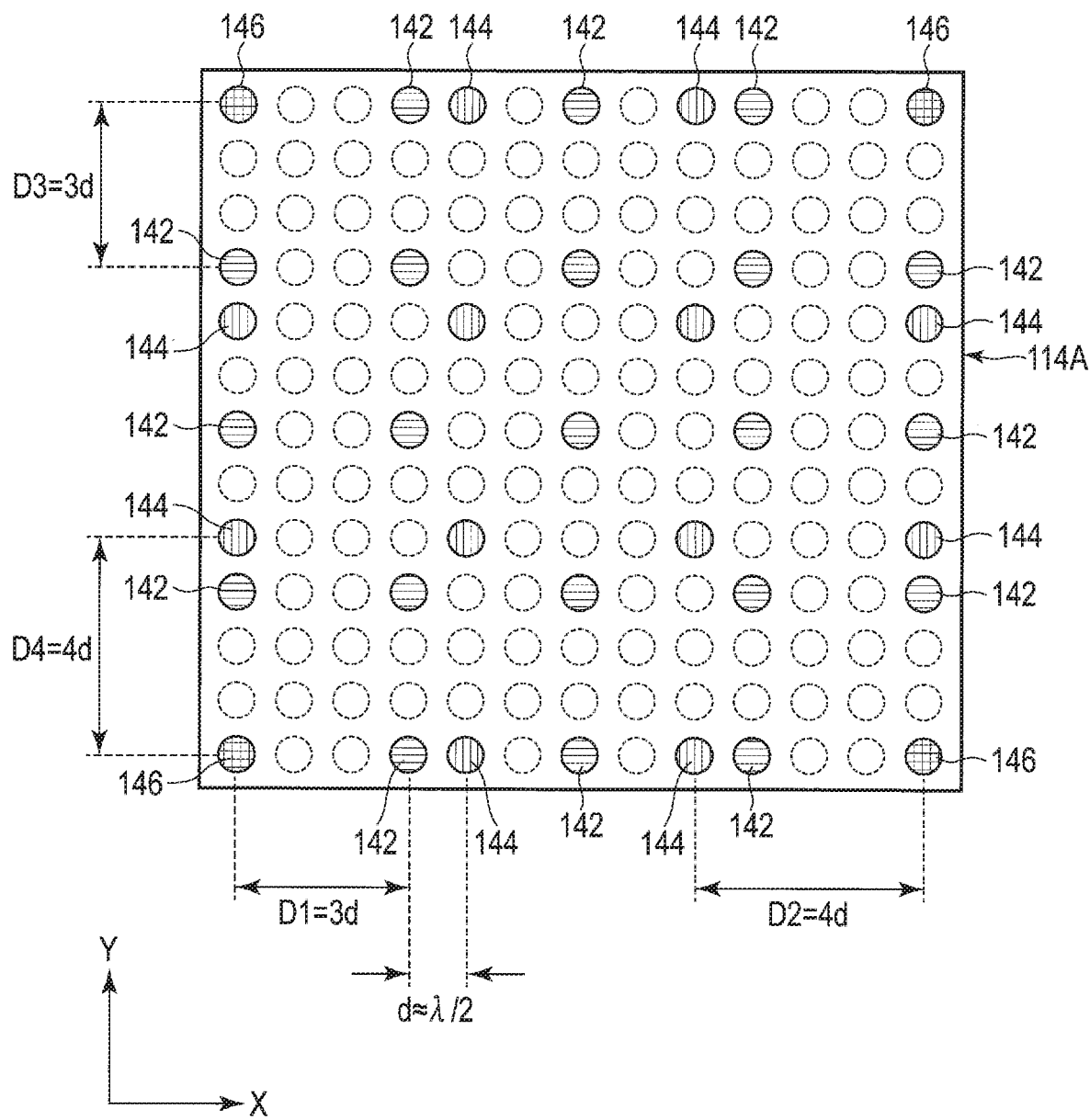
FIG. 18 is a diagram illustrating an example of an array antenna shown in FIG. 17.

FIG. 18 illustrates an example of the array antenna 114A. The array antenna 114A has a virtual lattice defined at a predetermined interval d (here, approximately half-wavelength $\lambda/2$), and antenna elements 116 (in FIG. 18, the antenna elements are indicated by 142, 144, and 146) are arranged at the intersections of the virtual lattices. As described above, in the secondary screening system, since the interval between the irradiation points of electromagnetic wave is short and the number of irradiation points is large, the detection accuracy of the secondary screening system is higher than that of the primary screening system. In the array antenna 114A of the secondary screening system, antenna elements are not arranged at all lattice intersections as in a case of a half wavelength array antenna, and actual antenna elements are not arranged at most lattice intersections (circles indicated by broken lines in FIG. 18). The antenna elements 116 of the array antenna 114A include first antenna elements 142, second antenna elements 144, and third antenna elements 146. The antenna elements 142, 144, and 146 are two-dimensionally arranged in the X and Y-directions at intervals that are several times the lattice interval d, with some exceptions. That is, the antenna elements in the array antenna 114A are arranged to be sparser than the antenna elements in the half wavelength array antenna, and the array antenna 114A is sparser than the half wavelength array antenna. Thus, interference between adjacent antenna elements does not occur in the array antenna 114A.

The first antenna elements 142 are arranged in the X-direction with an interval D1=m×d being m times the approximately half wavelength d. The second antenna elements 144 are arranged in the X-direction with an interval D2=n×d being n times the approximately half wavelength d. m and n indicate positive integers of two or more which are coprime, for example, m=3 and n=4. Specific numerical values of m and n are not limited thereto, and any value may be set.

The first antenna elements 142 are arranged in the Y-direction with an interval D3=p×d being p times the approximately half wavelength d. The second antenna elements 144 are arranged in the Y-direction with an interval D4=q×d being q times the approximately half wavelength d. p and q indicate positive integers of two or more which are coprime, for example, p=3 and q=4. Specific numerical values of p and q are not limited thereto, and any value may be set. For example, m and p may be different from each other, n and q may be different from each other, and the distance between the antenna elements may be different in the X-direction and the Y-direction.

The third antenna elements 146 are arranged at the four corners of array antenna 114A. The first antenna elements 142 and the third antenna elements 146 constitute the first sub-array antenna having an element interval D1=3d. The second antenna elements 144 and the third antenna elements 146 constitute the second sub-array antenna having an element interval D2=4d. As described above, the first sub-array antenna and the second sub-array antenna are array antennas having antenna element intervals that are coprime. The third antenna elements 146 are included in the first sub-array antenna and are included in the second sub-array antenna.

The resolution of an image generated using the two array antennas having antenna element intervals which are coprime is independent from the interval between the antenna elements of the two array antennas, and is determined by the aperture (size) of the array and a beam pattern of the antenna elements. The array size can be freely set, and the array antenna can completely cover the target by setting the array size to be equal to the cross-sectional area of the target. The beam pattern is set such that the transmit antenna element at any position can transmit an electromagnetic wave to the target, and the receive antenna element at any position can receive the electromagnetic wave reflected from the target. Therefore, the resolution of the image by the array antenna 114A can be equal to the resolution of the image by the half wavelength array antenna. The array antenna 114A has 37 antenna elements. In the half wavelength array antenna, since antenna elements are arranged at all lattice intersections, the number of antenna elements is 169. The number of antenna elements of the array antenna 114A can be reduced. If the number of antenna elements is small, time taken for transmission/reception is short, the data volume of the received signal is small, and the calculation time is short.

The characteristics of the array antenna in which antenna elements are arranged at intervals wider than the approximately half wavelength will be described. If the number of antenna elements is N, the antenna element interval is D, an excitation phase difference between the antenna elements is $\beta$, and the direction of the measurement point in the object is an angle of $\theta$ with respect to the array antenna surface, the propagation phase difference of the electromagnetic wave transmitted from the two antenna elements is $kD \cos \theta$. k indicates a wave number.

The total phase shift $\psi$ is represented as follows.

$$\psi = kD \cos \theta + \beta \qquad \text{Equation 6}$$

Considering the round trip of transmission and reception, the wave number k is represented by $4\pi/\lambda$. Thus, the normalized radiation pattern is represented as follows.

$$AF=(1/N)(\sin(N\psi/2)/\sin(\psi/2))$$ Equation 7

Equation 7 is a general representation of the radiation pattern of the array antenna. The maximum value of Equation 7 is obtained in a case as follows.

$$\psi=kD\cos\theta+\beta=\pm 2m\pi$$ Equation 8

Here, m=[0, 1, 2, . . . ]. In many cases, it is desirable that irradiation becomes a maximum in a direction perpendicular to the axis of the array. In order to obtain a first maximum value in the direction of θ=π/2, the following is necessary.

$$\psi=kD\cos\theta+\beta|\theta=\pi/2=\beta=0$$ Equation 9

For this reason, in order for the maximum value of the array factor to become a maximum in the direction perpendicular to the axis of the array antenna, it is necessary that all antenna elements have the same excitation phase. However, since D=λ/2 and β=0, the total phase shift ψ is represented as follows.

$$\psi=kD\cos\theta+\beta|\theta=0,\pi=\pm 2\pi$$ Equation 10

Substituting ψ in Equation 10 into Equation 7, the maximum value of the array factor is obtained when θ=0 and π. This means that the array factor has a maximum value at three points (θ=0, πn/2, and π). The two additional maximum values (θ=0 and π) are called grating lobes. Further, if D=2.5λ and β=0, it is understood that the maximum value at θ=0 shifts to an angle range of 0<θ<πn/2, the maximum value at θ=π shifts to an angle range of π/2<θ<π, and thus two additional grating lobes are generated. If the antenna element interval D is increased to 5λ, ten grating lobes are generated on both sides of the main lobe.

Therefore, when the antenna element interval D=πλ/2, n=1, 2, 3, . . . , the total phase shift ψ is represented as follows.

$$\psi=kD\cos\theta+\beta=2\pi n\cos\theta$$ Equation 11

$$2\pi n\cos\theta_m=2m\pi$$ Equation 12

If $\theta_m$ (m=[0, 1, 2, . . . ]) satisfying Equation 12 is provided, $\theta_m$ is a set of angles at which the array factor is the maximum value. That is, $\theta_m$ (m=[0, 1, 2, . . . ]) is represented as follows.

$$\theta_m=\cos^{-1}(m/n)$$ Equation 13

Since m and n of the antenna element interval D1=m×d (m=3) of the first sub-array antenna and the antenna element interval D2=n×d (n=4) of the second sub-array antenna in FIG. 18 are coprime, Equation 13 represents that the array factor of the two sub-array antennas simultaneously becomes the maximum value in the vertical direction (Z-direction) of the array.

Therefore, the positions of the grating lobes of the two sub-array antennas are different. According to transmission and reception by the array antenna in which antenna elements are arranged at intervals wider than the approximately half wavelength, a phantom is generated at the position of the grating lobe. Thus, the position of the phantom generated by the transmission and reception by the two coprime sub-array antennas is different. Accordingly, it is possible to remove the influence of the phantom by performing image processing on two images generated by transmission and reception by the two coprime sub-array antennas.

As described above, in the array antenna 114A including the first and second sub-array antennas in which the antenna element intervals are coprime, the interval between only some of the antenna elements 142 and 144 is d (=λ/2). Since the intervals between most of the antenna elements are 3d and 4d, interference between adjacent antenna elements does not occur. In addition, since the antenna elements are sparse, the number of antenna elements is small, the transmission/reception time is short, and the data volume of the received signal is small. The calculation time is also short.

The number of coprime sub-array antennas forming the array antenna 114A is not limited to two, and the array antenna 114A may be configured by three or more coprime sub-array antennas. In the case of the antenna element interval D1=m×d of the first sub-array antenna and the antenna element interval D2=n×d of the second sub-array antenna, m and n are positive integers of two or more that are coprime.

Figure 19A:
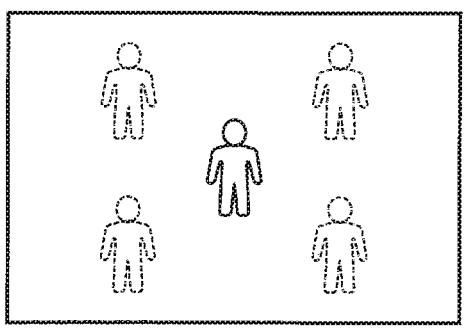
FIGS. 19A and 19B are diagrams illustrating an example of a first image and a second image respectively obtained by a first sub-array antenna and a second sub-array antenna forming the array antenna shown in FIG. 18.

An example of an image of the target person will be described with reference to FIGS. 19A, 19B, 20, and 21. FIG. 19A illustrates an example of a first image generated by transmitting and receiving an electromagnetic wave using the first sub-array antenna.

Figure 19B:
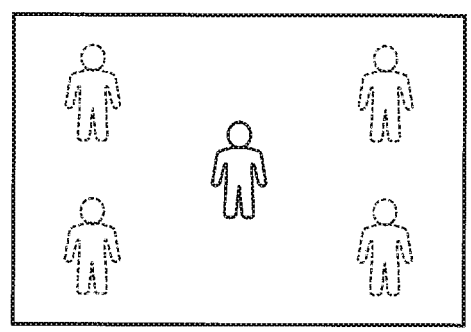
Figure 20:
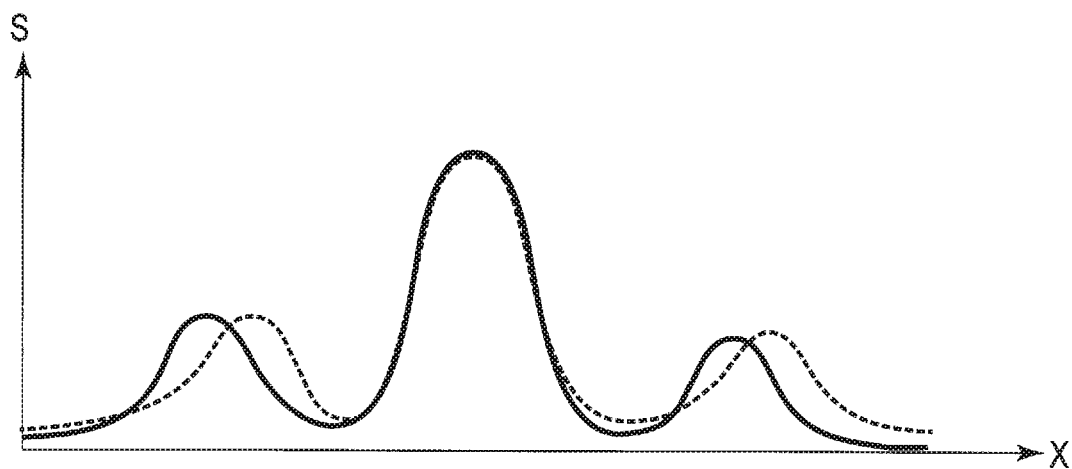
FIG. 20 is a graph illustrating an example of profiles of the first image and the second image shown in FIGS. 19A and 19B.
Figure 21:
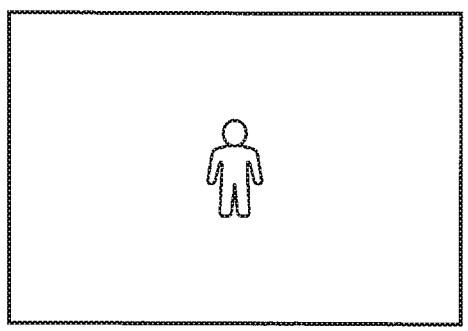
FIG. 21 is a diagram illustrating an example of an image of a target person, which is obtained by the system shown in FIG. 17.

FIG. 19B illustrates an example of a second image generated by transmitting/receiving an electromagnetic wave using the second sub-array antenna. FIG. 20 illustrates a profile (solid line) of an image signal S indicating the first image shown in FIG. 19A in an X-axis direction, and a profile (broken line) of an image signal S indicating the second image shown in FIG. 19B in the X-axis direction. As shown in FIGS. 19A and 19B, the first and second images by the first and second sub-array antennas include the image of the target at the center portion, and includes phantoms of the object at the peripheral portions. The position of the phantom is difference between the first image and the second image. Therefore, if the first image and the second image are combined (synthesized) by selecting the smaller absolute value of the first image signal and the second image signal in each pixel, it is possible to obtain a synthetic image with no influence of the phantom as shown in FIG. 21.

Figure 22:
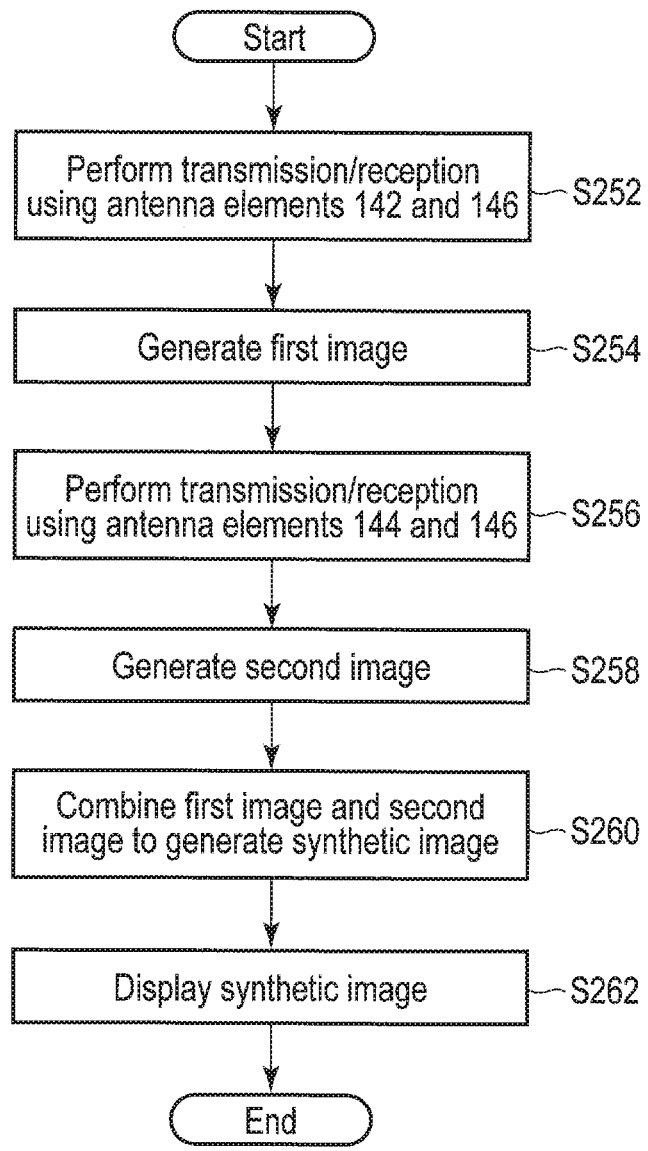
FIG. 22 is a flowchart illustrating an example of processing in the system shown in FIG. 17.

FIG. 22 is a flowchart illustrating an example of the screening in the radar shown in FIG. 18. The secondary screening starts if the communication device 141 receives information for identifying the target person determined to require the secondary screening and receives the degree of danger, from the communication device 42 in the primary screening system. For example, the controller 140 continuously determines whether the target person requiring secondary screening appears in the image captured by the camera 18. If the controller 140 detects that the target person has entered into the image, that is, has entered into the inspection area for secondary screening, the controller 140 starts the processing of the flowchart shown in FIG. 22.

In step S252, the controller 140 transmits and receives an electromagnetic wave using the first sub-array antenna including first antenna elements 142 and third antenna elements 146. The controller 140 controls the transmitter 132 and the receiver 134 such that an electromagnetic wave is sequentially transmitted from the antenna elements 142 and 146, and the antenna elements 142 and 146 sequentially receive an electromagnetic wave. In step S254, the image generation circuit 136 generates the first image based on the signals received by the antenna elements 142 and 146.

In step S256, the controller 140 transmits and receives an electromagnetic wave using the second sub-array antenna including second antenna elements 144 and third antenna elements 146. The controller 140 may sequentially transmit an electromagnetic wave from the antenna elements 144 and 146 and may control the antenna elements 144 and 146 to sequentially receive an electromagnetic wave. The controller 140 may simultaneously transmit an electromagnetic wave from all the antenna elements 144 and 146 of the second sub-array antenna, and may control the antenna elements 144 and 146 to sequentially receive an electromagnetic wave. In step S258, the image generation circuit 136 generates the second image based on the signals received by the antenna elements 144 and 146.

In step S260, the image processing circuit 138 combines the first image and the second image by selecting the smaller absolute value of the first image signal and the second image signal in each pixel, to generate a synthetic image having no influence of the phantom. In step S262, the display device 118 displays the synthetic image.

The operator of the radar 16 can visually view the synthetic image of the target person and accurately determine whether the target person possesses a dangerous article such as a handgun.

According to the secondary screening system shown in FIG. 17, the first and second images are generated using the first and second sub-array antennas having antenna element intervals that are coprime, and the first and second images are combined to select the minimum values. Thus, it is possible to obtain an image of a target without a phantom. Since an electromagnetic wave is transmitted and received by the first and second sub-array antennas having antenna element intervals that are coprime, advantages as follows are obtained. That is, interference between adjacent antenna elements does not occur. In addition, since the number of the antenna elements is small, the transmission/reception time is short, the data volume of the received signal is small, and the calculation time is short. Further, since the two-dimensional array antenna 114A is used, a three-dimensional image of the target can be obtained.

The above description relates to screening of determining whether a person possesses a dangerous article. However, the above screening system is not limited to a person, and can be applied to checking the mail items or parcels collected by a mailer or a carrier or the shielded contents of cardboard boxes and other items brought into the factory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
a first device with a primary screening area; and
a second device with a secondary screening area different from the primary screening area,
wherein:
the first device comprises a first antenna, first processor circuitry, and a first communication device;
the second device comprises a second antenna, second processor circuitry, and a second communication device;
the first antenna is configured to irradiate an electromagnetic wave to a target person in the primary screening area and receive an electromagnetic wave reflected by the target person;
the second antenna is configured to irradiate an electromagnetic wave to the target person in the secondary screening area and receive an electromagnetic wave reflected by the target person;
the first processor circuitry is configured to determine a degree of danger relating to a possibility that the target person possesses a dangerous article, based on a level of the electromagnetic wave received by the first antenna, and determine that a secondary screening is required for the target person in accordance with the degree of danger;
the first communication device is configured to transmit, to the second device, first information identifying the target person requiring the secondary screening;
the second processor circuitry is configured to make the second antenna start irradiation of the electromagnetic wave when the second communication device receives the first information; and
a number of irradiation points of the electromagnetic wave irradiated by the second antenna is larger than a number of irradiation points of the electromagnetic wave irradiated by the first antenna.

2. The system of claim 1, wherein:
the second device further comprises a camera; and
the second processor circuitry is configured to determine whether the target person requiring the secondary screening appears in an image captured by the camera and to make the second antenna start irradiation of the electromagnetic wave when it is determined that the target person appears in the image.

3. The system of claim 2, wherein the second processor circuitry is configured to determine whether the target person requiring the secondary screening enters into the secondary screening area and to make the second antenna start irradiation of the electromagnetic wave when it is determined that the target person enters into the secondary screening area.

4. The system of claim 1, wherein:
the second antenna comprises a first sub-array antenna and a second sub-array antenna;
a first antenna element interval of the first sub-array antenna is different from a second antenna element interval of the second sub-array antenna;
the second processor circuitry is configured to generate a first image signal based on a signal from the first sub-array antenna and a second image signal based on a signal from the second sub-array antenna; and
the second processor circuitry is configured to combine the first image signal and the second image signal to generate a synthesized image by selecting a smaller absolute value of the first image signal and the second image signal for each pixel of the synthesized image.

5. The system of claim 4, wherein:
the first antenna element interval is m×d;
the second antenna element interval is n×d;
d is an approximately half wavelength;
each of m and n is a positive integer of at least two; and
m and n are coprime.

6. The system of claim 1, wherein:
the first antenna is configured to sequentially irradiate (i) a first electromagnetic wave of a wavelength of 1 mm to 30 mm to a first position, (ii) a second electromagnetic wave of a wavelength of 1 mm to 30 mm to a second position different from the first position, and (iii) a third electromagnetic wave of a wavelength of 1 mm to 30 mm to a third position different from the first position and the second position;
the first position, the second position, and the third position are respective different positions along a scanning line in a first area of at least one of the target person and a belonging of the target person; and the first processor circuitry is configured to:
obtain a first reflection intensity of the first electromagnetic wave on the first position,
obtain a second reflection intensity of the second electromagnetic wave on the second position,
obtain a third reflection intensity of the third electromagnetic wave on the third position, and
determine the degree of danger relating to the possibility that the target person possesses a dangerous article, based on a difference between the first reflection intensity and the second reflection intensity and a difference between the second reflection intensity and the third reflection intensity.

7. The system of claim 1, wherein the degree of danger comprises information indicating whether or not the target person possesses the dangerous article, or information indicating a degree to which it is likely that the target person possesses the dangerous article.

8. The system of claim 6, wherein:
the first device further comprises a camera configured to capture an image; and
the first processor circuitry is configured to:
detect the first area in the image;
detect the first position, the second position, and the third position; and
output an instruction to the first antenna to irradiate the first electromagnetic wave to the first position, the second electromagnetic wave to the second position, and the third electromagnetic wave to the third position.

9. The system of claim 8, wherein the first processor circuitry is configured to detect, as the first area, an area of a body of the target person.

10. The system of claim 1, wherein the first processor circuitry is configured to determine the degree of danger by using machine learning.

11. The system of claim 6, wherein the first device further comprises a scanning mechanism configured to move the first antenna along the line, or to rotate the first antenna to change an irradiation direction of the first electromagnetic wave, the second electromagnetic wave, and the third electromagnetic wave in a fan shape.

12. An inspection method in an inspection system, the inspection system comprising a first device with a primary screening area and a second device with a secondary screening area different from the primary screening area, the first device comprising a first antenna, first processor circuitry, and a first communication device, the second device comprising a second antenna, second processor circuitry, and a second communication device, and the method comprising:
by the first antenna, irradiating an electromagnetic wave to a target person in the primary screening area and receiving an electromagnetic wave reflected by the target person;
determining, by the first processor circuitry, a degree of danger relating to a possibility that the target person possesses a dangerous article, based on a level of the electromagnetic wave received by the first antenna, and determining that a secondary screening is required for the target person in accordance with the degree of danger;
transmitting, by the first communication device to the second device, first information identifying the target person requiring the secondary screening; and
by the second processor circuitry, making the second antenna start irradiation of an electromagnetic wave to the target person in the secondary screening area and receiving of an electromagnetic wave reflected by the target person when the second communication device receives the first information,
wherein a number of irradiation points of the electromagnetic wave irradiated by the second antenna is larger than a number of irradiation points of the electromagnetic wave irradiated by the first antenna.

13. The method of claim 12, wherein the second device further comprises a camera, and the method further comprises:
by the second processor circuitry, determining whether the target person requiring the secondary screening appears in an image captured by the camera, and making the second antenna start irradiation of the electromagnetic wave when it is determined that the target person appears in the image.

14. The method of claim 13, further comprising:
by the second processor circuitry, determining whether the target person requiring the secondary screening enters into the secondary screening area and making the second antenna start irradiation of the electromagnetic wave when it is determined that the target person enters into the secondary screening area.

15. The method of claim 12, wherein the second antenna comprises a first sub-array antenna and a second sub-array antenna, a first antenna element interval of the first sub-array antenna is different from a second antenna element interval of the second sub-array antenna, and the method further comprises:
by the second processor circuitry, generating a first image signal based on a signal from the first sub-array antenna and a second image signal based on a signal from the second sub-array antenna; and
by the second processor circuitry, combining the first image signal and the second image signal to generate a synthesized image by selecting a smaller absolute value of the first image signal and the second image signal for each pixel of the synthesized image.

16. The method of claim 15, wherein:
the first antenna element interval is m×d;
the second antenna element interval is n×d;
d is an approximately half wavelength;
each of m and n is a positive integer of at least two; and
m and n are coprime.

17. The method of claim 12, further comprising:
by the first antenna, sequentially irradiating (i) a first electromagnetic wave of a wavelength of 1 mm to 30 mm to a first position, (ii) a second electromagnetic wave of a wavelength of 1 mm to 30 mm to a second position different from the first position, and (iii) a third electromagnetic wave of a wavelength of 1 mm to 30 mm to a third position different from the first position and the second position, the first position, the second position, and the third position being respective different positions along a scanning line in a first area of at least one of the target person and a belonging of the target person; and
by the first processor circuitry, obtaining (i) a first reflection intensity of the first electromagnetic wave on the first position, (ii) a second reflection intensity of the second electromagnetic wave on the second position, and (iii) a third reflection intensity of the third electromagnetic wave on the third position,
wherein the determining by the first processor circuitry comprises determining the degree of danger relating to the possibility that the target person possesses a dangerous article, based on a difference between the first reflection intensity and the second reflection intensity and a difference between the second reflection intensity and the third reflection intensity.

18. The method of claim 12, wherein the degree of danger comprises information indicating whether or not the target person possesses the dangerous article, or information indicating a degree to which it is likely that the target person possesses the dangerous article.

19. The method of claim 17, wherein the first device further comprises a camera configured to capture an image, and the method further comprises, by the first processor circuitry:
   detecting the first area in the image;
   detecting the first position, the second position, and the third position; and
   outputting an instruction to the first antenna to irradiate the first electromagnetic wave to the first position, the second electromagnetic wave to the second position, and the third electromagnetic wave to the third position.

20. The method of claim 19, wherein the detecting the first area comprises detecting, as the first area, an area of a body of the target person.

21. The method of claim 12, wherein the determining comprises determining the degree of danger by using machine learning.

22. The method of claim 17, further comprising at least one of:
   moving the first antenna along the line; and
   rotating the first antenna to change an irradiation direction of the first electromagnetic wave, the second electromagnetic wave, and the third electromagnetic wave in a fan shape.

23. A system comprising:
   a first device; and
   a second device,
   wherein:
   the first device comprises a first antenna, first processor circuitry, and a first communication device;
   the second device comprises a second antenna, second processor circuitry, and a second communication device;
   the first antenna is configured to irradiate an electromagnetic wave to a target person and receive an electromagnetic wave reflected by the target person;
   the second antenna is configured to irradiate an electromagnetic wave to the target person and receive an electromagnetic wave reflected by the target person;
   the first processor circuitry is configured to determine a degree of danger with machine learning, the degree of danger relating to a possibility that the target person possesses a dangerous article, based on a level of the electromagnetic wave received by the first antenna;
   the first communication device is configured to transmit, to the second device, first information indicating that further inspection of the target person is required based on the degree of danger;
   the second processor circuitry is configured to make the second antenna start irradiation of the electromagnetic wave when the second communication device receives the first information;
   the second processor circuitry is configured to determine a degree of danger relating to a possibility that the target person possesses a dangerous article, based on a level of the electromagnetic wave received by the second antenna;
   the machine learning is performed based on the degree of danger determined by the first processor and the degree of danger determined by the second processor; and
   a number of irradiation points of the electromagnetic wave irradiated by the second antenna is larger than a number of irradiation points of the electromagnetic wave irradiated by the first antenna.

24. An inspection method in an inspection system, the inspection system comprising a first device and a second device, the first device comprising a first antenna, first processor circuitry, and a first communication device, the second device comprising a second antenna, second processor circuitry, and a second communication device, and the method comprising:
   by the first antenna, irradiating an electromagnetic wave to a target person and receiving an electromagnetic wave reflected by the target person;
   determining, by the first processor circuitry, a degree of danger with machine learning, the degree of danger relating to a possibility that the target person possesses a dangerous article, based on a level of the electromagnetic wave received by the first antenna;
   transmitting, by the first communication device to the second device, first information indicating that further inspection of the target person is required, based on the degree of danger;
   by the second processor circuitry, making the second antenna start irradiation of an electromagnetic wave to the target person and receiving of an electromagnetic wave reflected by the target person when the second communication device receives the first information;
   by the second processor circuitry, determining a degree of danger relating to a possibility that the target person possesses a dangerous article, based on a level of the electromagnetic wave received by the second antenna; and
   making the second antenna start irradiation of an electromagnetic wave to the target person and receiving of an electromagnetic wave reflected by the target person when the second communication device receives the first information,
   wherein:
   a number of irradiation points of the electromagnetic wave irradiated by the second antenna is larger than a number of irradiation points of the electromagnetic wave irradiated by the first antenna, and
   the machine learning is performed based on the degree of danger determined by the first processor and the degree of danger determined by the second processor.

* * * * *